United States Patent
Lo et al.

(10) Patent No.: US 6,757,347 B1
(45) Date of Patent: Jun. 29, 2004

(54) SOURCE SYNCHRONOUS LINK WITH DATA AND CLOCK SIGNALS HAVING THE SAME ELECTRICAL CHARACTERISTICS

(75) Inventors: Karen Lo, Sunnyvale, CA (US); Jeffery A. Benis, San Jose, CA (US); Alan R. Desroches, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,214

(22) Filed: Apr. 28, 2000

(51) Int. Cl.[7] .................................................. H04L 7/00
(52) U.S. Cl. ...................................... 375/355; 713/401
(58) Field of Search .............................. 375/354, 355, 375/259; 713/400, 401

(56) References Cited

U.S. PATENT DOCUMENTS

| | | | |
|---|---|---|---|
| 5,706,484 A | 1/1998 | Mozdzen et al. | 395/551 |
| 5,723,995 A | 3/1998 | Mozdzen et al. | 327/293 |
| 5,768,529 A | 6/1998 | Nikel et al. | 395/200.62 |
| 5,774,001 A | 6/1998 | Mozdzen et al. | 327/141 |
| 5,919,265 A | 7/1999 | Nishtala et al. | 713/400 |
| 6,016,066 A | 1/2000 | Ilkbahar | 327/23 |
| 6,311,285 B1 * | 10/2001 | Rodriguez et al. | 713/401 |

* cited by examiner

Primary Examiner—Young T. Tse
Assistant Examiner—David B. Lugo

(57) ABSTRACT

Methods and apparatus for halting the data strobes transmitted over a source synchronous link to enable the data stored in the data capture flip-flops in a source synchronous receiver to be scanned out for subsequent analysis. This allows for the evaluation of the captured data without placing additional components in the functional data path and, therefore, without increasing the latency of the transmission. To provide optimal timing margins the data and data strobe paths are logically and electrically matched. This includes routing the data and data strobe signals in close proximity from the transmitter to the receiver, and through the same logical and physical elements in the transmitter and receiver. This insures that any injected link noise is experienced common-mode. In addition, the data strobe signal is preferably driven at one-half of the period of the data signal so that the data strobe and data signals experience logical state transitions at the same time and at the same frequency. This insures maximally similar electrical modes on the communication link, further maximizing link margin.

12 Claims, 15 Drawing Sheets

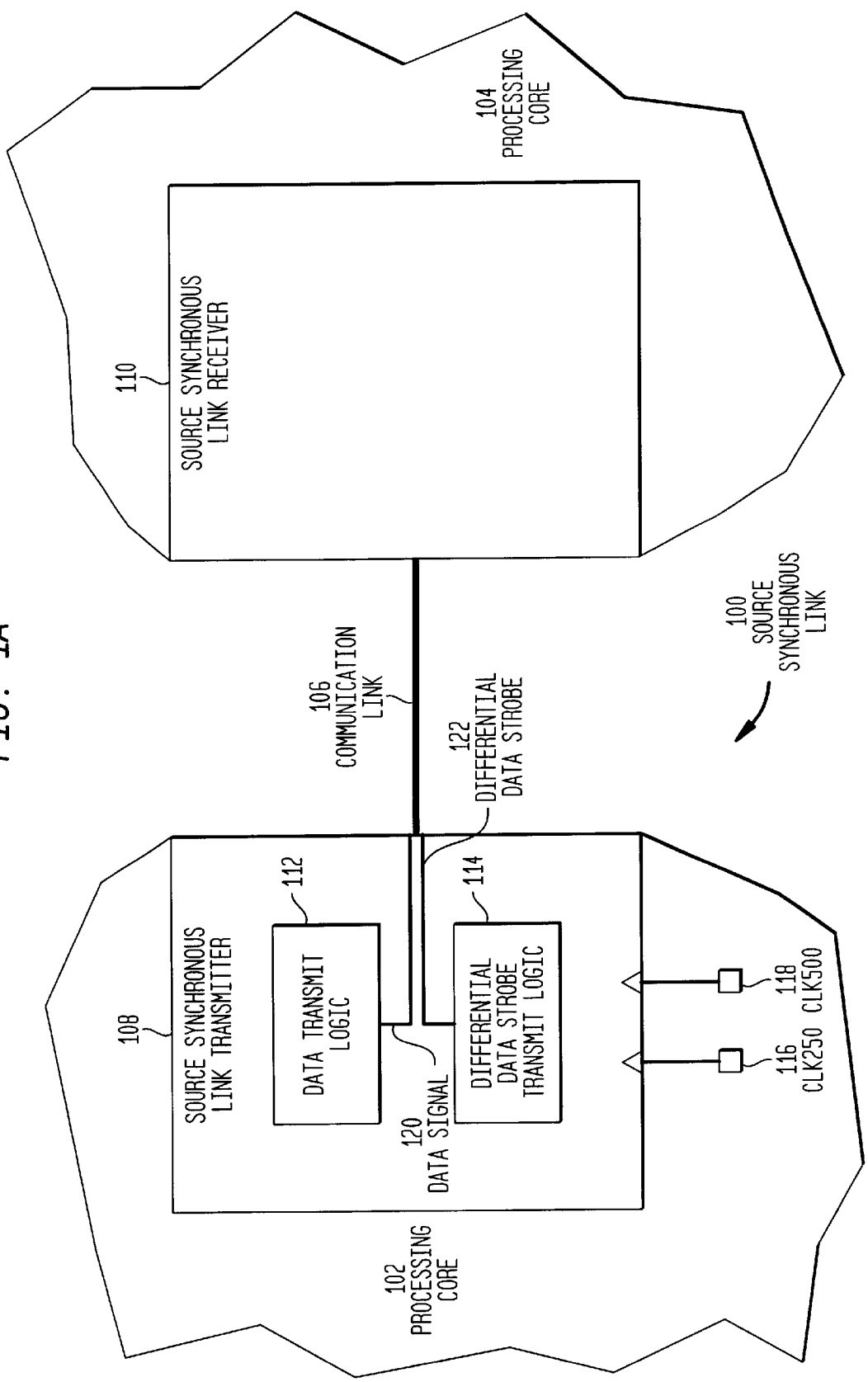

200
DATA AND DATA STROBE
SIGNAL RELATIONSHIPS

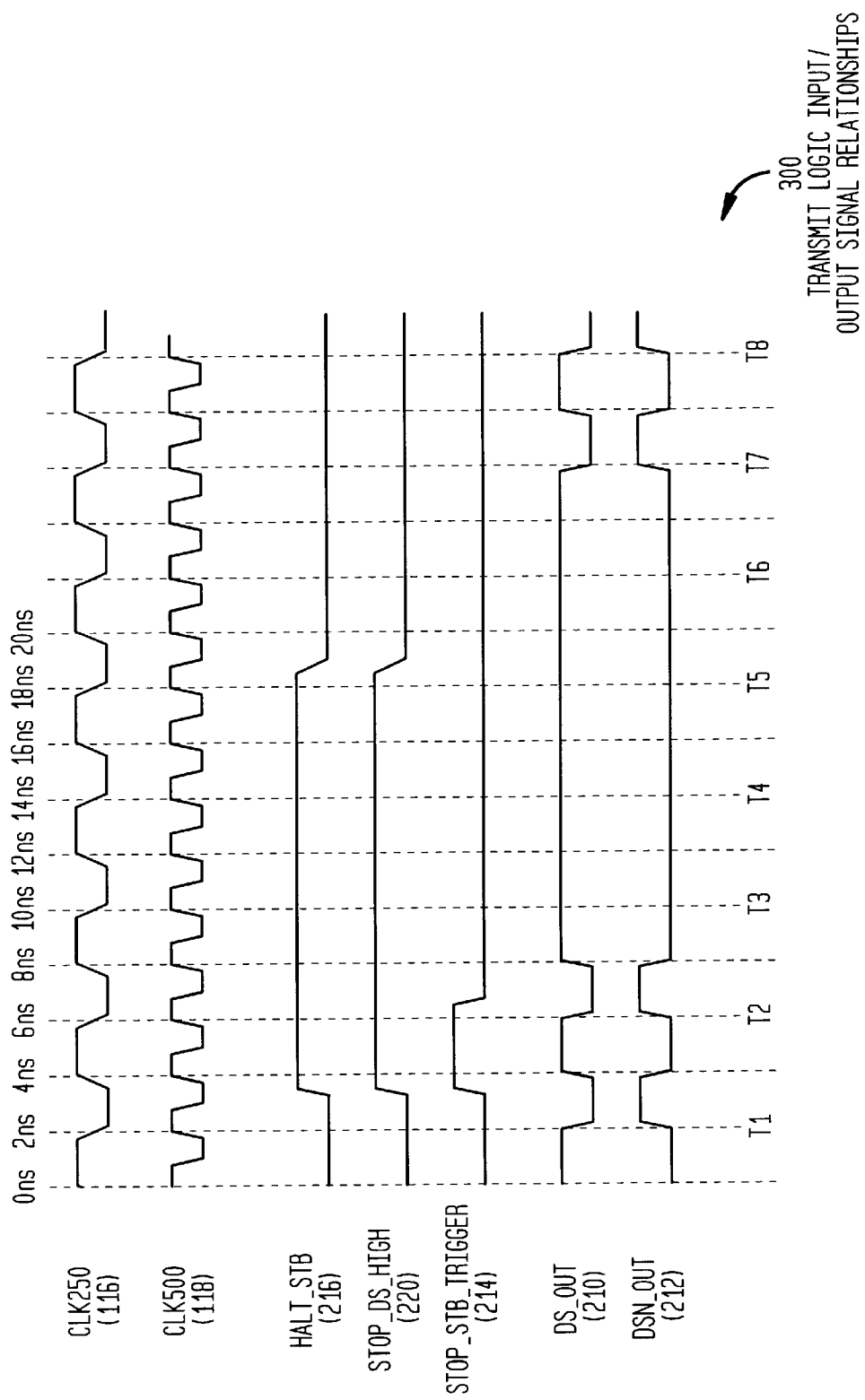

500
PULSE STRETCH LOGIC
TIMING RELATIONSHIPS

700
DIFFERENTIAL DATA STROBE
CONTROL TIMING RELATIONSHIPS

1200
DATA TRANSMIT
SIGNAL RELATIONSHIPS

SOURCE SYNCHRONOUS LINK WITH DATA AND CLOCK SIGNALS HAVING THE SAME ELECTRICAL CHARACTERISTICS

RELATED APPLICATIONS

This application shared a common disclosure with a commonly-owed U.S. Utility patent application Ser. No. 09/560,364 entitled "HALTING DATA STROBES ON A SOURCE SYNCHRONOUS LINK AND UTILITZATION OF SAME TO DEBUG DATA CAPTURE PROBLEMS" naming as inventors Karen Lo and Robert D. Snyder, filed concurrently herewith the specification of which is herein incorporated by reference.

BACKGROUND OF THE INVENTION

1. Field of the Invention

The present invention relates generally to source synchronous communication links and, more particularly, to optimizing timing margins in source synchronous communication link.

2. Related Art

Chipsets and other devices communicate over a trace, bus, wire or other communication link or channel. External clocks are often used to synchronize the timing between such communicating components. Typically, with regard to chipsets, an external clock chip generates a system clock that is routed throughout the circuit board to different components for translation into an internal clock. The internal clock is then used by the individual components to generate internal and external signals. The extended routing of the system clock combined with the translation of the system clock to an internal clock by individual components results in timing variations at the interface of the different components. For systems operating at a low frequency most such timing variations can be absorbed by a longer system clock cycle while more extreme timing variations can be bypassed through the addition of wait states to the valid time of a signal.

Recent advances in microprocessor technology have provided processors with substantially greater operating frequencies. To fully utilize the benefits provided by such microprocessors, system clock speeds must be increased. As the system clock speeds have increased, common-clocked, data transfer systems developed problems such as flight time delays, clock skews, etc.

To overcome these communication problems source synchronous communication techniques have been developed. In a source synchronous environment, clock or strobe signals are sent between components along with the data signals to communicate timing information. Instead of having one or more components operate on a common clock signal, data is communicated at a speed that is not set by a common clock signal. The strobe signal sent with the data may be used, for example, to start an internal clock, for latching of the data, or for other timing purposes. In this way, source synchronous communication eliminates many of the noted problems of traditional, common-clocked, data transfers, thereby providing increased data transfer rates over traditional data transfer schemes.

The term 'data eye" is commonly used to describe the shape of the data waveform as it has a shape resembling a partially closed eye. Typically, the data strobe, which may be a single or two differential signals, is skewed so that it is phase shifted by 90 degrees (centered) with respect to the data signal with which it is sent. That is, a rising or falling edge of the data strobe falls close to the center of the data eye. This guarantees that each data bit is stable at the source synchronous receiver at the time of receipt of the corresponding clock signal, increasing the likelihood that the data will be properly latched into the source synchronous receiver.

Unfortunately, however, a high-speed source synchronous communication link is susceptible to electrical data capture errors. Electrical characteristics of the link such as connector quality, length of trace lines, capacitive and inductive coupling, cross-talk and the like degrade the integrity of the data signal; that is, diminish the size of the data eye. The timing and noise margins of the data signals, which are determined by the width and height, respectively, of the data eye, are likewise decreased. For high-speed communication links, these reductions, particularly in the timing margin, prevent the communication link from operating at the targeted frequencies.

A number of traditional approaches have been suggested to determine whether data capture errors have occurred. One conventional approach has been to use scan-on-the-fly (SOTF) techniques. Such techniques, which are commonly used to capture data located in internal registers in the core of a chip, require the addition of a debug flip-flop coupled to the output of each of the data capture flip-flops. Such shadow flip-flops receive the captured data as it is output from the data capture flip-flop. The captured data can then be made available for subsequent analysis. One drawback to this approach is that since a debug flip-flop must be coupled to each data capture flip-flop, twice as many flip-flops must be implemented, drastically increasing the requisite area consumed by the receiving device. More importantly, perhaps, is the increased capacitive loading that is placed on the data capture flip-flops, which may be significant depending on the distance between the shadow flip-flop and its corresponding data capture flip-fop. This increased capacitive loading on the data capture flip-flops increases the latency of the data path, further reducing the timing margins.

Another approach has been to scan the captured data directly from the data capture flip-flops. However, to scan the data from the flip-flops, additional devices such as a multiplexer must be implemented in the functional data path to control the clock provided to the data capture flip-flops. Such additional components in the functional data path increase the latency of the data path, further reducing the timing margins.

What is needed, therefore, is an apparatus and methodology for optimizing the timing margins of a source synchronous communication link and for determining the data capture capability of a source synchronous link without introducing additional logic, area or latency in the functional data path.

SUMMARY OF THE INVENTION

The present invention is directed to providing optimal timing margins by logically and electrically matching the data and data strobe paths. This includes routing the data and data strobe signals in close proximity from the transmitter to the receiver, and through the same logical and physical elements in the transmitter and receiver. This insures that any injected link noise is experienced common-mode. In addition, the data strobe signal is preferably driven at one-half of the period of the data signal so that the data strobe and data signals experience logical state transitions at the same time and at the same frequency. This insures maximally similar electrical modes on the communication link, further maximizing link margin.

A number of aspects of the invention are summarized below, along with different embodiments that may be implemented for each of the summarized aspects. It should be understood that the embodiments are not necessarily inclusive or exclusive of each other and may be combined in any manner that is non-conflicting and otherwise possible. It should also be understood that these summarized aspects of the invention are exemplary only and are considered to be non-limiting.

In one aspect of the invention, a source synchronous link is disclosed. The source synchronous link includes a source synchronous transmitter and receiver connected by a communication link. The transmitter includes a first logic structure configured to generate a data signal over a data line of the communication link, and a second logic structure configured to generate one or more data strobe signals over a corresponding one or more clock lines of the communication link. The first and second logic structures are of substantially identical configuration and operate in response to a same local clock.

In one particular embodiment, the communication link routes the data and clock lines in close proximity between the transmitter and receiver to insure interference is experienced common-mode. In addition, the data and data strobe signals are preferably routed in through the same logical and physical elements in the receiver.

In another embodiment, the relative frequency of the data signal and the one or more data strobe signals are such that the data and data strobe signals experience logical state transitions simultaneously. For example, the data strobe signals may be transmitted at a first frequency and the data signal is transmitted at a second frequency that is twice the first frequency.

In another aspect of the invention, a source synchronous transmitter for use in a source synchronous link to transmit a data signal and a data strobe signal to a source synchronous receiver is disclosed. The transmitter is configured to implement data transmit and data strobe transmit logic structures having logically and electrically identical components and component configurations such that the data signal and the data strobe signal have a substantially identical response to electrical interference and noise.

In a still further aspect of the invention, a source synchronous link is disclosed. This source synchronous link includes a communication link and a source synchronous transmitter. The transmitters include a first logic structure configured to generate a data signal over a data line of a communication link, and a second logic structure configured to generate one or more data strobe signals over a corresponding one or more clock lines of the communication link. The first logic and second logic structures are of substantially identical configuration and operate in response to a same local clock. Preferably, the communication links route the data line and the corresponding clock lines in close proximity between the transmitter and receiver. Also, the data and data strobe signals are preferably routed in through the same logical and physical elements in the receiver.

In one particular embodiment, the relative frequency of the data signal and the one or more data strobe signals are such that the data strobe signal and data strobe signals experience logical state transitions simultaneously and at a same frequency. Preferably, the data signal is double pumped at frequencies that cause the data signal and the data strobe signals to transition logical states simultaneously.

The present invention is directed to methods and apparatus for halting the data strobes transmitted over a source synchronous link to enable the data stored in the data capture flip-flops in a source synchronous receiver to be scanned out for subsequent analysis. Advantageously, this allows for the evaluation of the captured data without placing additional components in the functional data path and, therefore, without increasing the latency of the transmission.

Various embodiment of the present invention provide certain advantages and overcome certain drawbacks of the above and other conventional techniques. Not all embodiments of the present invention share the same advantages and those that do may not share them under the same or similar circumstances. Further features and advantages of the present invention as well as the structure and operation of various embodiments of the present invention are described in detail below with reference to the accompanying drawings. In the drawings, like reference numerals indicate like or functionally similar elements. Additionally, the left most one or two digits of a reference numeral identify the drawing in which the reference numeral first appears.

BRIEF DESCRIPTION OF THE DRAWINGS

The present invention is pointed out with particularity in the appended claims. The above and further features and advantages of this invention may be better understood by referring to the following description when taken in conjunction with the accompanying drawings, in which:

FIG. 1A is a block diagram of two processing cores communicating over a source synchronous link in accordance with aspects of the present invention.

FIG. 3 is a timing diagram illustrating the relationship between processing core control signals and the differential data strobe signals in accordance with one aspect of the present invention.

DETAILED DESCRIPTION

Table of Contents

Figure 1B:
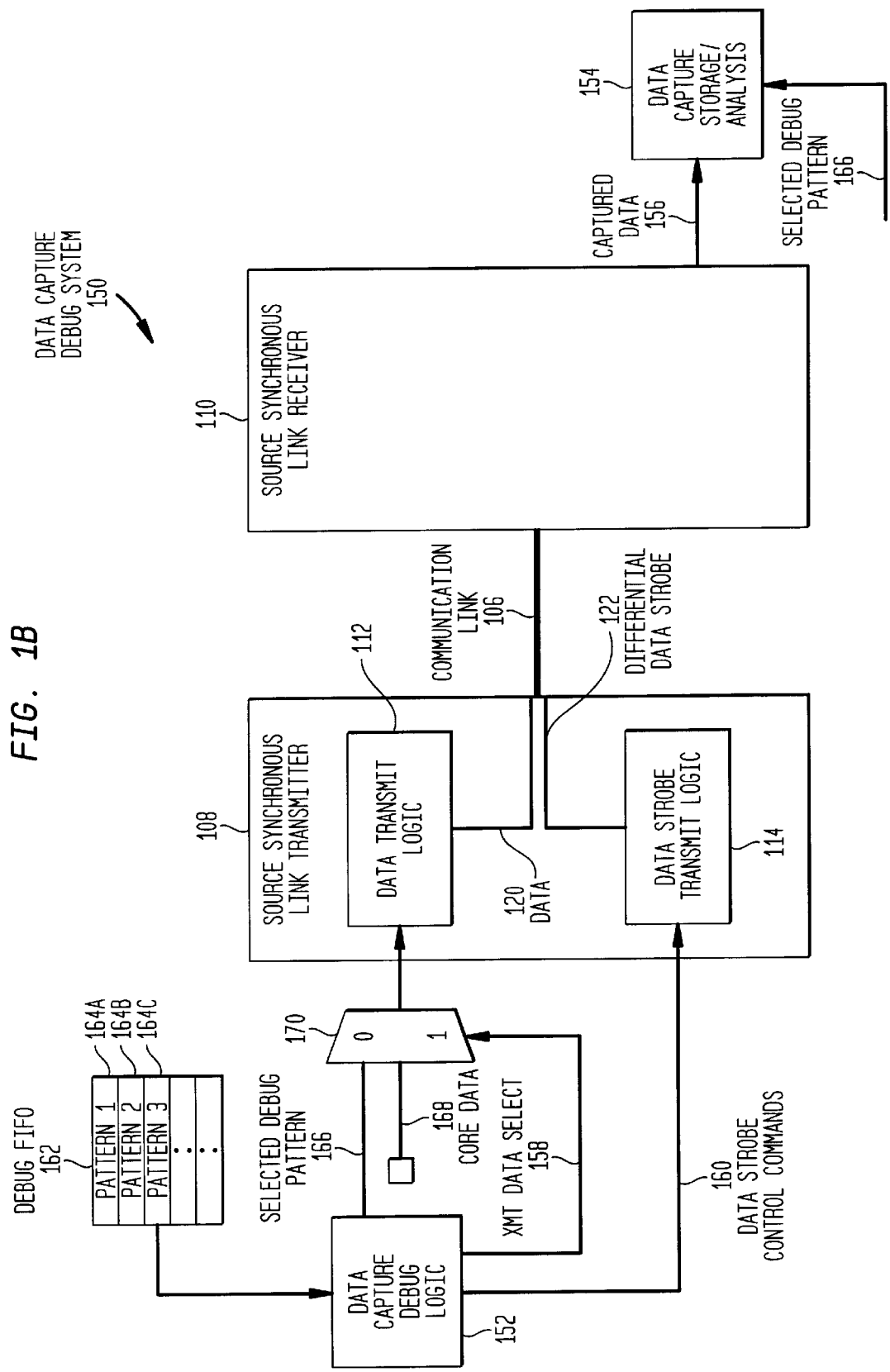
FIG. 1B is a block diagram of an exemplary debug system in which aspects of the present invention may be implemented.

A. Introduction
B. Exemplary Source Synchronous Link Environment
C. Exemplary Data Capture Debug System
D. Source Synchronous Link Transmitter
  1. Differential Data Strobe Transmit Logic
    a. Data and Data Strobe Signal Relationship
    b. Data Strobe Halt Command and Data Strobe Signal Relationship
    c. Pulse Stretch Logic
    d. Differential Data Strobe Control Logic
    e. Differential Data Strobe Level Select Logic
  2. Data Transmit Logic
E. Source Synchronous Link Receiver

A. Introduction

The present invention is directed to methods and apparatus for halting the data strobes transmitted over a source synchronous link to enable the data stored in the data capture flip-flops in a source synchronous receiver to be scanned out for subsequent analysis. Advantageously, this allows for the evaluation of the captured data without placing additional components in the functional data path and, therefore, without increasing the latency of the transmission.

The present invention is also directed to providing optimal timing margins by logically and electrically matching the data and data strobe paths. This includes routing the data and data strobe signals in close proximity from the transmitter to the receiver, and through the same logical and physical elements in the transmitter and receiver. This insures that any injected link noise is experienced common-mode. In addition, the data strobe signal is preferably driven at one-half of the period of the data signal so that the data strobe and data signals experience logical state transitions at the same time and at the same frequency. This insures the data and data strobe signals have substantially the same electrical characteristics on the communication link, further maximizing link margins.

At least one preferred aspect and embodiment of the present invention is described in detail below. While specific configurations are provided, it should be understood that such configurations are illustrative only and that other components, configurations and operations may be implemented without departing from the scope of the present invention.

B. Exemplary Source Synchronous Link Environment

FIG. 1A is a block diagram of two processing cores communicating over a source synchronous link 100 in accordance with aspects of the present invention. A first processing node or core 102 includes a source synchronous transmitter 108 and a second processing node or core 104 includes a source synchronous receiver 100. Source synchronous transmitter 108 and source synchronous receiver 110 are connected via a communication channel or link 106. Data is transferred across link 106 along with an accompanying clock. This arrangement is generally referred to as a source synchronous link 100.

Source synchronous transmitter 108 and receiver 110 include input and output (I/O) cells and driver and receiver logic connected to a system level interconnect such a printed circuit board trace. The input and Output cells act as an interface between the driver and receiver and the printed circuit board interconnect. Such devices are considered to be well known in the art and are not described further herein.

Source synchronous transmitter 108 generally includes data transmit logic 112 and differential data strobe transmit logic 114. Data transmit logic 112 manages the transmission of data signals 120 over a data line of communication link 106. Differential data strobe transmit logic 114 generates a differential clock or data strobe signal 122 over two clock lines of source synchronous link 106. Source synchronous transmitter 108 receives a local or core clock 116 and, in certain aspects of the invention, a second local or core clock 118. As will be described in detail below, the second clock may be generated internally by transmitter 108 and need not be implemented in all aspects of the present invention.

In one embodiment each processing core 102, 104 has both a transmitter 108 and receiver 110. Accordingly, each processing core can be both driving data to, and receiving data from, another processing core concurrently; that is, the communication link 106 is full duplex. In the disclosed embodiment, the clock signal that is transmitted with the data signals is referred to as a data strobe and is sent differentially. That is, there are two clock lines for the data strobe between transmitter 108 and receiver 110, each line having an inverse clock or strobe signal of the other. As such, the exemplary embodiments of the invention presented herein include what is referred to as a differential data strobe. As will described in detail below, the two data strobe signals are used to latch data into receiver 110 on both edges of the clock cycle. However, it should be understood that the present invention may be implemented in source synchronous links implementing single-ended clock or data strobe signal as well.

As will be described in detail below, in certain aspects of the invention, the data transmitted over source synchronous link 106 is "double pumped." That is, the data signal 120 is transmitted at twice the frequency as the differential data strobe 122. That is, source synchronous transmitter 108 is responsible for the transfer of 2 bits of data over a single data line. That is, transmitter 108 and receiver 110 manage, in a preferred embodiment, 2 bits of data with every data strobe pulse. A source synchronous link implementing the present invention may include any number of data lines in conjunction with the one (single-ended) or two (differential) data strobe line(s). For example, in one implemented embodiment, the present invention is implemented in a source synchronous environment wherein 36 bits are transferred from transmitter 108 and receiver 110. Thus, in embodiments wherein the source synchronous link is double pumped with 2 bits transmitted over each data line, there are 18 data lines and 1 or 2 data strobe lines in communication link 106. It should also be understood, then, that each such transmitter 108 and receiver 110 are replicated 18 times. It should also be noted, however, that the present invention is scalable to any size system to satisfy any communication requirement. For ease of illustration, however, the drawings will depict a single data slice only.

In the illustrative embodiment, the differential data strobe is a 250 MHz clock signal derived from local clock CLK250 116 and the data signal 120 is a 500 MHz data signal derived from local clock CLK500 118. As will be described below, in certain aspects of the invention, the relative clock frequencies are such that the logic level transitions are synchronized. However, the present invention may implement data strobe(s) having a frequency other than 250 and 500 MHz.

The terms "node", "core", "logic", "circuit" and the like should be interpreted broadly when considered in conjunction with the present invention. Such terms embody any and all implementations of the disclosed functions and operations. Further, other terms such as module, unit, system, subsystem and the like should not be construed limiting in any way and are provided to facilitate structural, operational or functional relationships.

C. Exemplary Data Capture Debug System

FIG. 1B is a block diagram of an exemplary debug system in which aspects of the present invention may be implemented. As noted, certain aspects of the present invention are utilized to determine whether source synchronous receiver 110 has properly captured the data transmitted from transmitter 108. The exemplary debug system 150 includes source synchronous transmitter 108 and receiver 110, the details of which are set forth below. In addition, debug system 150 includes data capture debug logic 152 operationally coupled to processing core 102, and data capture storage and analysis logic 154 operationally coupled to processing core 104. In accordance with aspects of the present invention, debug logic 152 controls transmitter 108 to halt differential data strobe 122 when transmitting a predetermined bit pattern 166 to receiver 110. Data capture storage and analysis logic 154 subsequently scans data capture flip-flops (not shown) in source synchronous receiver 110 to retrieve and store captured data 156 for comparison with the transmitted debug pattern 166.

A debug FIFO 162 in processing core 102 stores one or more predetermined debug bit patterns 164A–164N for transmission over communications link 106. Such bit patterns 164 may be arranged to include specific patterns designed to identify certain capabilities of the implemented source synchronous link. One such bit pattern is chosen as selected debug pattern 166. Data capture debug logic 152 controls multiplexer 170 to input selected debug pattern 166 to data transmit logic 112. Under normal operating conditions, core data 168 is provided to data transmit logic 112 for transmission.

Data capture debug logic 152 generates one or more data strobe control commands 160 to cause data strobe transmit logic 114 to halt differential data strobe 122. Halting the data strobes transmitted over communication link 106 provides an opportunity for data capture storage and analysis logic 154 to scan the data stored in data capture flip-flops in receiver 110. This is because the data strobe signals control the data capture flip-flops and, when the data strobe signals are halted, no additional data is written to the data capture flip-flops.

It should be appreciated from the present disclosure that providing a source synchronous transmitter that halts the data strobe allows for the evaluation of the captured data without placing additional components in the functional data path. As such, this aspect of the present invention does not increase the latency of the transmission and, therefore, does not adversely effect the timing margin of the data signal 120.

D. Source Synchronous Link Transmitter 108
1. Differential Data Strobe Transmit Logic 114

Figure 2A:
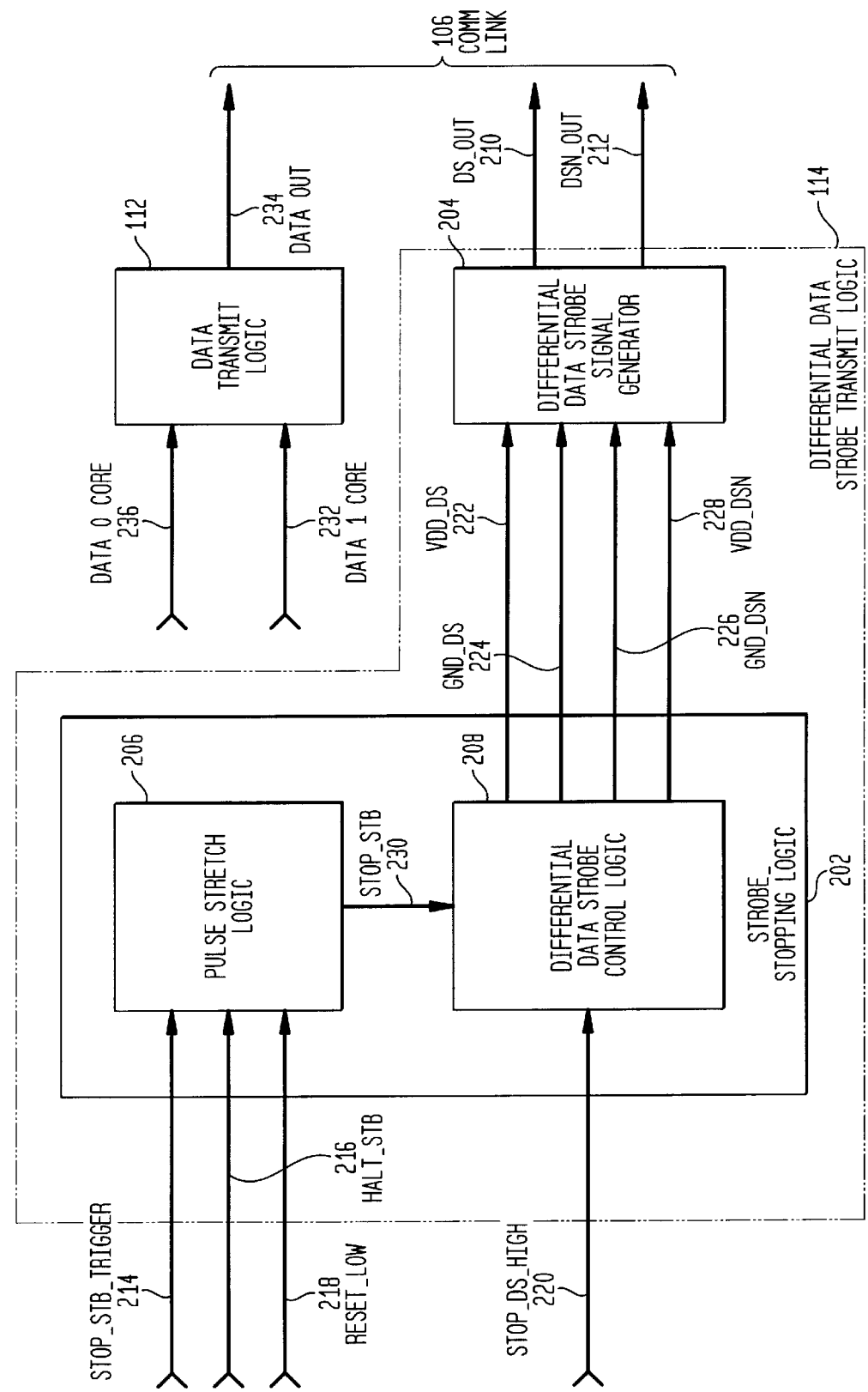
FIG. 2A is functional block diagram of one embodiment of differential data strobe transmits logic illustrated in FIG. 1A.

FIG. 2A is a functional block diagram of differential data strobe transmit logic 114. Differential data strobe transmit logic 114 generates the differential data strobe 122 comprising data strobe signal DS_OUT 210 and inverse data strobe signal DSN_OUT 212 over communication link 106. Differential data strobe transmit logic 114 includes differential data strobe signal generator logic 204 that determines the shape of the waveform of DS_OUT 210 and DSN_OUT 212. Transmit logic 114 also includes strobe stopping logic 202 that controls the signal level states used by signal generator logic 204 to cause DS_OUT 210 and DSN_OUT 212 to remain halted in a desired logical state.

Signal generator logic 204 selects alternately between two applied signal levels to generate DS_OUT 210 and DSN_OUT 212. Differential data strobe signal generator 204 receives as inputs four logic level signals, two logic level signals for selection to generate DS_OUT 210 and two logic level signals for selection to generate DSN_OUT 212. For DS_OUT 210, the input logic level signals include VDD_DS 222 and GND_DS 224. Similarly, for DSN_OUT 212, the two input logic level signals are GND_DSN 226 and VDD_DSN 228.

As indicated by their names, in normal operations during which the differential data strobe 122 is not halted, input signals VDD_DS 222 and VDD_DSN 228 are held consistently in their asserted state while GND_DS 224 and GND_DSN 226 are held consistently in their de-asserted state. Under the control of a 250 MHz clock, signal generator 204 selects alternately VDD_DS 222 and GND_DS 224 to generate a 250 MHz data strobe signal DS_OUT 210. Similarly, signal generator logic 204 selects alternately between VDD_DSN 228 and GND_DSN 226 to generate a 250 MHz inverse data strobe signal DSN_OUT 212. As will be described in detail below, the differential data strobe signals 210, 212 are generated as single ended bits that are opposite in phase with each other. This insures that the differential data strobe and data signals transmitted through source synchronous link 100 are logically and electrically matched. This, in turn, insures that the injected link noise is experienced common-mode.

As noted, strobe stopping logic 202 provides to differential data strobe signal generator 204 the logic level signals 222, 224, 226, 228 for data strobe signal DS_OUT 210. In this illustrative embodiment, there are a number of command signals generated by processing core 102 that specify when the differential data strobe 122 is to be halted and, preferably, the state in which the differential data strobe signals DS_OUT 210 and DSN_OUT 212 are to be halted.

In this embodiment, the data strobe control command signals 160 include a HALT_STB 216. HALT_STB 216 indicates whether differential data strobe transmit logic 114 is to operate in a normal operating mode (normal toggling of different data strobe signals 210, 212) or in a halt data strobe mode of operation (differential data strobe signals 210, 212 held in logical state). In addition, a STOP_STB_TRIGGER signal 214 indicates the precise time the differential data strobe 122 is to be halted. The state in which the data strobe 210 and the inverse data strobe 212 are halted is determined by the state of another input signal, STOP_DS_HIGH 220.

Strobe stopping logic 202 includes primarily two functional elements, differential data strobe control logic 208 and pulse stretch logic 206. Pulse stretch logic 206 generates a data strobe stop signal STOP_STB 230 that remains in the asserted logical state for the duration in which the differential data strobe 122 is to be halted. The STOP_STB 230 signal is used by differential data strobe 122 is to transmit normally; that is, as 1- or 2-pulse signals. It should be understood that there are a myriad of other techniques that one can implement to communicate such information.

Pulse stretch logic 206 receives as inputs the strobe halt mode signal HALT_STB 216 and the halting trigger STOP_STB_TRIGGER 214. Also, an active low reset signal RESET_LOW 218 is provided to pulse stretch logic 206. In accordance with certain aspects of the invention, the STOP_STB_TRIGGER 214 and HALT_STB 216 signals are registered at a first clock frequency, here, 250 MHz, prior to being provided to pulse stretch logic 206.

When the differential data strobe 122 is to be halted, HALT_STB 216 is asserted. RESET_LOW 218 is an active low signal and, therefore, is asserted in non-reset conditions. Thus, when the stop trigger signal STOP_STB_TRIGGER 214 is received while transmit logic 114 is in the halt data strobe mode of operation (HALT_STB 216 is asserted) and transmit logic 114 is not reset (RESET_LOW 218 is asserted), the stop strobe signal STOP_STB 230 is asserted. STOP_STB 230 remains asserted until the device is reset or HALT_STB 216 changes logical state indicating that the differential data should no longer be halted.

Differential data strobe control logic 208 sets the logic levels that are used to generate the transmitted differential data strobe signals DS_OUT 210 and DSN_OUT 212 in response to STOP_STB 230 and STOP_DS_HIGH 220. In this illustrative embodiment, the differential data strobe 122 may be halted with the data strobe signal DS_OUT 210 asserted and the inverted data strobe signal DSN_OUT 212 de-asserted, or with DS_OUT 210 de-asserted and DSN_OUT 212 asserted. Differential data strobe control logic 208 makes this determination based on the state of the control signal STOP_DS_HIGH 220 when the stop strobe signal STOP_STB 230 indicates that the differential data strobe is to be halted. The data strobe and inverse data strobe signals are to be halted in the specified state for the period of time in which stop strobe signal 230 is asserted.

Differential data strobe control logic 208 controls the four logic level signals provided to level select logic 204. Of the four signals, two provide logical high (VDD_DS 222) and low (GND_DS 224) signals for DS_OUT 210 while the other two provide logical high (VDD_DSN 228) and low (GND_DSN 226) signals for DSN_OUT 212. As noted, under normal operating conditions, these four signals remain at their respective logical high and low states indefinitely. This enables level select logic 204 to alternatively select VDD_DS 222 or GND_DS 224 to drive DS_OUT 210, and to select either GND_DSN 226 or VDD_DSN 228 to drive DSN_OUT 212. This generates, as noted, two individual signals that toggle out of phase with each other at 250 MHz.

In accordance with aspects of the present invention, the differential data strobe 122 is halted by virtue of control logic 208 changing the logical state of one or more of the logic level signals 222, 224, 226, 228 provided to level select logic 204. As will described in detail below, when the differential data strobe 122 is to be halted with DS_OUT 210 asserted, then the logical state of GND_DS 224 is changed from a de-asserted state to an asserted state so that when signal generator 204 switches from VDD_DS 222 to GND_DS 224 to drive DS_OUT 210, the same asserted logical state is provided continually to signal generator 204. As a result, DS_OUT 210 is continually in the asserted state. Similarly, should the differential data strobe 12 be halted with DS_OUT 210 in the de-asserted state, then data strobe control logic 208 changes the logical state of VDD_DS 222 from its asserted state to a de-asserted state so that when signal generator 204 switches from VDD_DS 222 to GND_DS 224, the same low logical state is provided to signal generator 204. this results in DS_OUT 210 having a continuous de-asserted logical state as it toggles between VDD_DS 222 and GND_DS 224. This same approach is implemented to control the inverse data strobe signal DSN_OUT 212 by adjusting the logical states of VDD_DSN 228 and GND_DSN 226.

It should be noted that this approach to halting the differential data strobe is exemplary only and, in particular, is provided to accommodate the interface requirements with differential data strobe signal generator 204. By controlling the logical level signals provided to differential data strobe signal generator 204, this embodiment of the invention places all logic for halting the differential data strobe 122 in the strobe stopping logic 202, enabling the signal generator 204 to remain unchanged. Those of ordinary skill in the art will appreciate that other implementations would be possible without deviating from the scope of the present invention.

As noted, while differential data strobe signals 210, 212 are halted by strobe stopping logic 202, no additional data can be clocked into the source synchronous receiver 110. The data received immediately before the halting of the differential data strobe can then be scanned from receiver 110 for analysis.

a. Data and Data Strobe Signal Relationship

Also illustrated in FIG. 2A is a functional representation of data transmit logic 112. As will be described in greater detail below, data transmit logic 112 implements a logic structure that is identical to that implemented by differential data strobe signal generator 204 to insure the data signal 120 and differential data strobe signal 122 have substantially identical experiences in terms of interference and noise as they are generated by source synchronous link transmitter 108.

To further insure such similar experiences the data transmitted over source synchronous link 106 is "double pumped." That is, data is transmitted over the data link at twice the frequency as the differential data strobe 122. In the illustrative embodiment, the differential data strobe has a frequency of 250 MHz. Thus, in this embodiment, DATA_OUT 234 operates at 500 MHz. A timing diagram illustrating the relationship between these signals is provided in FIG. 2B.

Figure 2B:
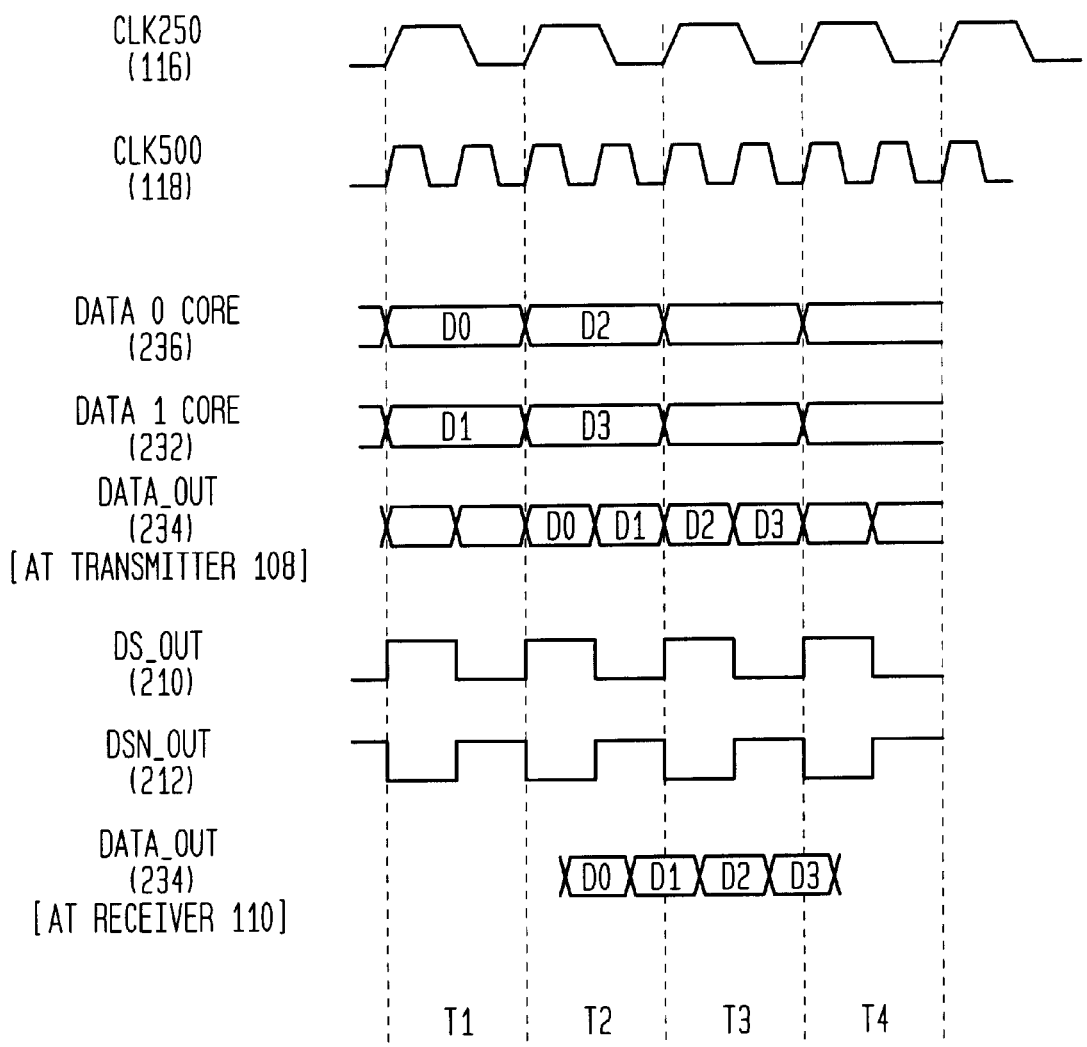
FIG. 2B is a timing diagram illustrating the relationship between the signals depicted in FIG. 2A.

Referring now to FIG. 2B the 250 MHz clock CLK250 116 and the 500 MHz clock CLK500 118 are depicted at the top of the figure. Below these two exemplary waveforms are the two data core signals received by data transmit logic 112 from processing core 102, DATA0_CORE 236 and DATA1_CORE 232. Each such signal provides two bits of data in this example. Bits D0 and D2 are provided at time periods T1 and T2 on DATA0_CORE 236 and bits D1 and D3 are provided at time periods T1 and T2 on DATA1_CORE 232.

As will be described in detail below, data transmit logic 112 transmits the received data on a DATA_OUT signal 234 at twice the frequency of the differential data strobe of 250 MHz, or 500 MHz. This is illustrated in FIG. 2B with data bits D0 and D1 being transmitted during time period T2 and data bits D2 and D3 being transmitted during time period T3.

The differential data strobe signals DS_OUT 210 and DSN_OUT 212 are depicted immediately below DATA_OUT 234. Comparing these three signals illustrates the alignment of logic level transitions. That is, each occurrence of a signal transition in the differential data strobe signals 210, 212, occurs at the same time and at the same frequency as the signal transitions of the data signal 234. As noted, this insures that the data and data strobe lines of communication link 106 experience the same electrical modes. This contributes to the electrical matching of the data and data strobes, thereby maximizing link margins.

At the bottom of FIG. 2B another data signal is illustrated, also referred to as DATA_OUT 234. This latter waveform of DATA_OUT 234 illustrates the phase shifting imparted on DATA_OUT 234 when it is received at source synchronous receiver 110. The captured data signal 234 is shifted relative to the differential data strobe signals 210, 212 by one 500 MHz clock period, placing the rising and falling edges of DS_OUT 210 and DSN_OUT 212 in the center of the data signal DATA_OUT 234. As will be described in detail below, the data signal DATA_OUT 234 is latched into source synchronous receiver 110 at the rising edges of DS_OUT 210 and DSN_OUT 212. By shifting the relative phase of the data and data strobe signals to center the differential data strobe edges in the data eye insures the data signal DATA_OUT 234 is stable before it is latched into source synchronous receiver 110. In a preferred embodiment, this is achieved by adding extra delay into the media that carries the differential data strobe signals. In a preferred embodiment, extra trace is added to the printed circuit board.

b. Data Strobe Halt Command and Data Strobe Signal Relationship

FIG. 3 is a timing diagram illustrating the relationship between the control signals received from processing core 102 and the resulting state of the differential data strobe signals DS_OUT 210 and DSN_OUT 212 in accordance with one aspect of the present invention. In FIG. 3 the reference numerals for the signals/signal lines are provided in a parenthetical after the signal name to facilitate correlation with the embodiment of differential data strobe transmit logic 114 illustrated in FIG. 2A. It should be noted that there is no implied relationship between the time periods Tn illustrated in FIG. 3 and the time periods illustrated in other timing diagrams provided herein unless expressly stated. Also, the labeled time periods represent cycles of the 250 MHz clock CLK250 116.

As noted, there are three signals that are provided by processing core 102 to control the halting of the differential data strobe 122 and the state of the halted differential data strobe signals in this embodiment of the invention. These control signals include HALT_STB 216, STOP_DS_HIGH 220 and STOP_STB_TRIGGER 214. In this example, HALT_STB 216 transitions from a low logical state to a high logical state during time interval T1 indicating that transmit logic 114 is to halt the differential data strobe upon receipt of a stop strobe trigger signal STOP_STB_TRIGGER 214. In this example, a STOP_DS_HIGH 220 is also asserted during time period T1 indicating that DS_OUT 210 is to be halted in the asserted logical state. In response, transmit logic 114 enters a state during which it waits for the receipt of trigger signal STOP_STB_TRIGGER 214 to halt the differential data strobe signals DS_OUT 210 and DSN_OUT 212.

In this example, STOP_STB_TRIGGER 214 is received at the same time as the other two control signals, that is, during time period T1, although this need not be the case. Control signals 216, 220 and 214 are registered in the 250 MHz clock domain. On the first rising edge of the 250 MHz clock CLK250 116, STOP_STB_TRIGGER 214 is latched into strobe stopping logic 202. This is described in greater detail below. The 250 MHz clock cycle after STOP_STB_TRIGGER 214 is latched, strobe stopping logic 202 processes the signal. As indicated at the top of FIG. 3, there is an approximate 4 ns delay. At the following rising edge of CLK250, time period T3, the differential data strobe signals DS_OUT 210 and DSN_OUT 212 are halted in the state specified by STOP_DS_HIGH 220.

The differential data strobe signals 210, 212 remain in their halted states until HALT_STB 216 transitions to a de-asserted state indicating that differential data strobe transmit logic 114 is to cease operating in the halt data strobe mode of operation and return to the normal mode of operation. HALT_STB 216 transitions to a logical low state during time period T5 that is latched at the next rising clock edge, time period T6. After a one cycle delay (time period T6), the differential data strobe signals DS_OUT 210 and DSN_OUT 212 return to normal operations at the next falling edge during time period T7.

It should be appreciated to those of ordinary skill in the art that the same information can be communicated from processing core 102 to source synchronous transmitter 108 using more or less command signals. The use of such variations is considered to be within the scope of the present invention.

c. Pulse Stretch Logic 206

As noted, pulse stretch logic 206 generates the data strobe stop signal STOP_STB 230 that is used by control logic 208 as described herein. Pulse stretch logic 206 receives as inputs the strobe halt mode signal HALT_STB 216 and the halting trigger STOP_STB_TRIGGER 214. Also, active low reset signal RESET_LOW 218 is also provided to pulse stretch logic 206.

Preferably, STOP_STB_TRIGGER 214 and HALT_STB 216 are AND'ed with RESET_LOW 218 prior to being received by pulse stretch logic 206 to prevent the two control signals from being asserted during a system reset condition. Both signals are latched into a flip-flop using a 250 MHz clock signal prior to being provided to pulse stretch logic 206.

Figure 4:
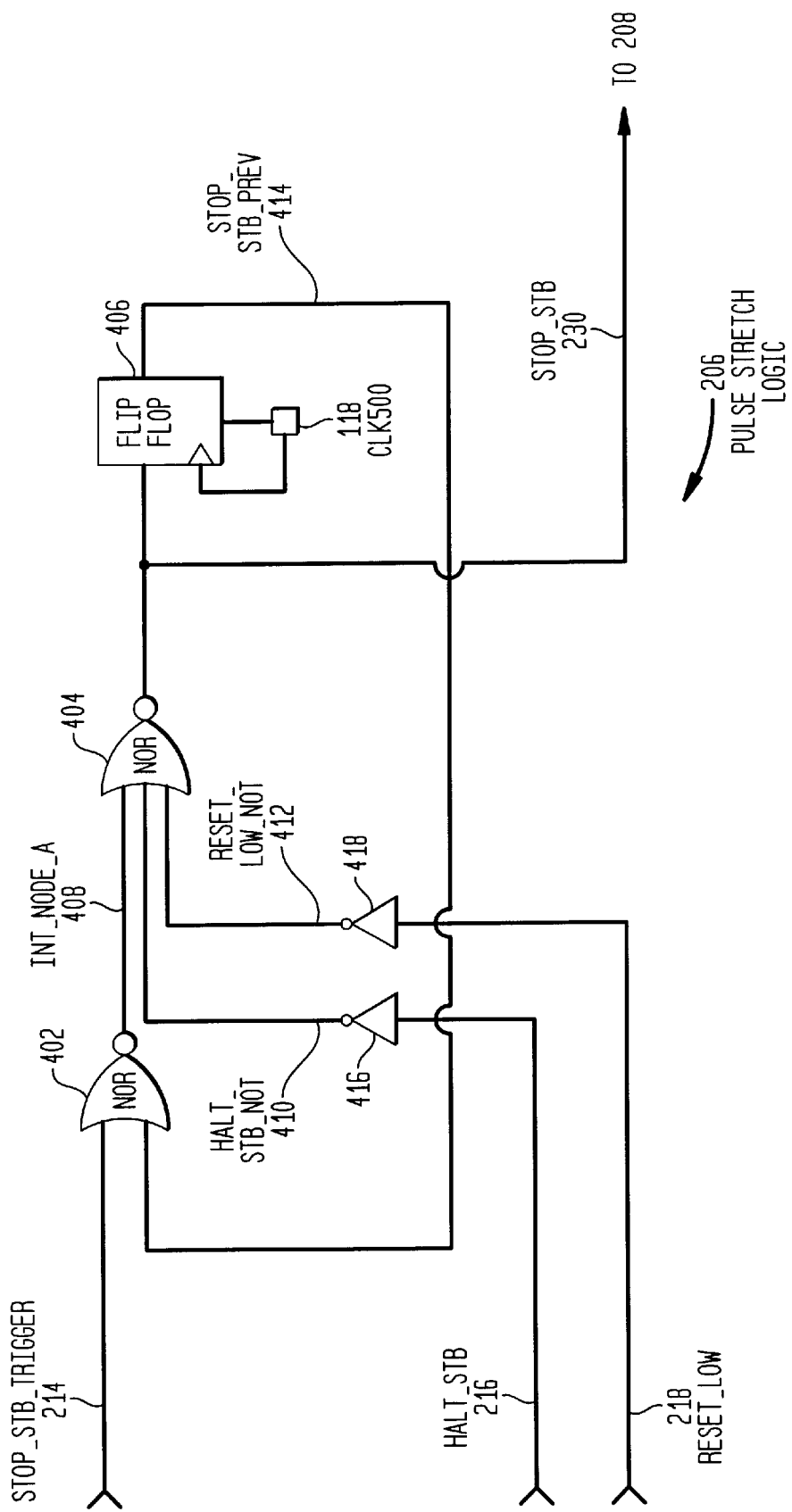
FIG. 4 is a schematic diagram of one embodiment of the pulse stretch logic illustrated FIG. 2A.

Referring now to the exemplary embodiment of pulse stretch logic 206 illustrated in FIG. 4, there are two NOR gates 402 and 404 and a flip-flop 406 clocked by the 500 MHz clock signal 118. STOP_STB_TRIGGER 214 and a signal indicating whether the stop strobe trigger STOP_STB_TRIGGER 214 was asserted previously are provided as inputs to NOR gate 402. STOP_STB_PREV 414 is input into NOR gate 402. The output of NOR gate 402 is INT_NODE_A 408. The operation of NOR gate 402 is provided below. NOR gate 404 has 3 inputs: INT_NODE_A 408, HALT_STB_NOT 410 and RESET_LOW_NOT 412. The output of NOR gate 404 is STOP_STB 230. This signal is latched into flip-flop 406 using the 500 MHz clock CLK500 118. This signal is also provided to differential data strobe control logic 208 as the signal controlling the invocation and duration of the halted differential data strobe 122.

With regard to NOR gate 402, if either input, STOP_STB_TRIGGER 214 or STOP-STB_PREV 414 is asserted, NOR gate 402 de-asserts INT_NODE_A 408, causing STOP_STB 230 to be asserted. STOP_STB 230 is clocked into flip-flop 406 at the next occurring rising edge of the 500 MHz clock CLK500 118 and returned to NOR gate 402. This will thereafter cause the output of NOR gate 402 INT_NODE_A 408 to remain asserted. Thus, when the stop trigger signal STOP_STB_TRIGGER 214 is received while transmit logic 114 is in halt data strobe mode of operation (HALT_STB 216 is asserted) and transmit logic 114 is not reset (RESET_LOW 218 is asserted), the stop strobe signal STOP_STB 230 is asserted. STOP_STB 230 remains asserted until the device is reset or HALT_STB 216 changes state indicating that the differential data strobe is to no longer be halted.

Figure 5:
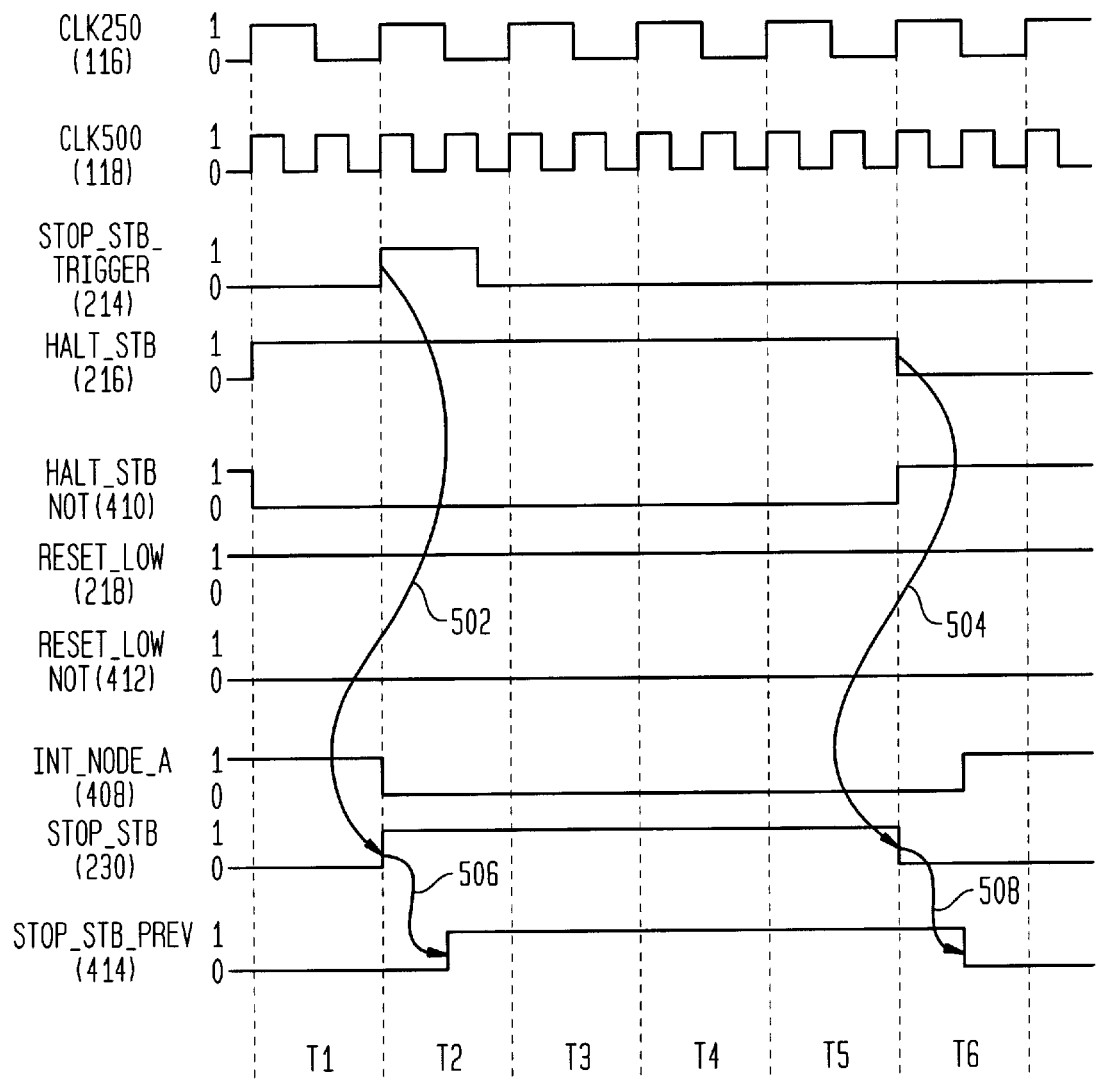
FIG. 5 is a timing diagram illustrating the operation of the pulse stretch circuit when the strobe stopping logic receives instructions to enter the strobe halting mode of operation.

FIG. 5 is a timing diagram illustrating the operation of pulse stretch circuit 206 when the strobe stopping logic 202 receives instructions to enter the strobe halting mode of operation. As with the other timing diagrams, in FIG. 5 the reference numerals for the signals/signal lines are provided in a parenthetical after the signal name to facilitate correlation with the embodiment of pulse stretch logic 206 illustrated in FIG. 4. Also, the time periods illustrated in FIG. 5 have no relationship with other timing diagrams illustrated herein unless expressly stated.

In time period T1 HALT_STB 216 is asserted invoking the halt data strobe mode of operation and placing pulse stretch circuit 206 is a waiting state. When STOP_STB_TRIGGER 214 is asserted at time T2, STOP_STB 230 is asserted. This relationship is illustrated in FIG. 5 by arrow 502. As shown, STOP_STB_TRIGGER 214 is asserted for less than one clock 250 cycle. However, as noted, STOP_STB 230 remains in an asserted state until HALT_STB 216 is de-asserted at time period T6. This relationship is illustrated in FIG. 5 by arrow 504.

As noted, STOP_STB 230 is latched at 500 MHz by flip-flop 406. This is illustrated in FIG. 5 as the rising edge of signal 408 occurring at the next rising edge of CLK500 118 after the transition of STOP_STB 230, as illustrated by arrow 506.

It should be understood that pulse stretch logic 206 may be implemented in is numerous other configurations and with many other circuit components. It should also be understood that the logic elements illustrated in FIG. 4 are dictated by the need to provide a stop strobe signal 230 in response to the occurrence of the triggering event until instructed otherwise. Here, the condition that ceases the end of halting of the differential data strobe 122 is the end of the halt data strobe mode of operation, as represented by the de-assertion of the signal HALT_STB 216. Other conditions represented by other signals may be utilized. Furthermore, NOR gate 402 and flip-flop 406 are provided to maintain STOP_STB 230 in an asserted state after trigger signal 214 is de-asserted. Such elements are unnecessary in embodiments wherein trigger signal 214 remains asserted for the period of time during which the data strobe is to be halted.

d. Differential Data Strobe Control Logic 208

Differential data strobe control logic 208 sets the logic levels that are used to generate the transmitted differential data strobe 122 signals DS_OUT 210 and DSN_OUT 212. As noted, the differential data strobe 122 may be halted with the data strobe signal DS_OUT 210 asserted and the inverted data strobe signal DSN_OUT 212 de-asserted, or with DS_OUT 210 de-asserted and DSN_OUT 212 asserted.

Differential data strobe control logic 208 makes this determination based on the state of the control signal STOP_DS_HIGH 220. When STOP_DS_HIGH 220 is asserted, the differential data strobe 122 is halted with DS_OUT 210 in the asserted state and DSN_OUT 212 in the de-asserted state. When STOP_DS_HIGH 220 is de-asserted, the differential data strobe 122 is halted with DS_OUT 210 in the de-asserted state and DSN_OUT 212 in the asserted state. However, as noted, control logic 208 performs these operations only when the stop strobe signal STOP_STB 230 received from pulse stretch circuit 206 is asserted.

Differential data strobe control logic 208 controls the four logic level signals 222–228 provided to level select logic 204. Of the four logic level signals, two provide logical high (VDD_DS 222) and low (GND_DS 224) logic level signals for DS_OUT 210 while the other two provide logical high (VDD_DSN 228) and low (GND_DSN 226) logic level signals for DSN_OUT 212. Under normal operating conditions, these four signals remain at their respective logical high and low states indefinitely. This enables signal generator 204 to alternately select VDD_DS 222 or GND_DS 224 to drive DS_OUT 210, and to alternately select either GND_DSN 226 or VDD_DSN 228 to drive DSN_OUT 212. Thus, DS_OUT 210 and DSN_OUT 212 are simply two individually controlled signals that are out of phase with each other.

In this embodiment of the present invention, the differential data strobe 122 is halted by virtue of control logic 208 changing the logical state of one or more of the logic level signals 222, 224, 226, 228 provided to signal generator 204. As noted, when the differential data strobe 122 is to be halted with DS_OUT 210 asserted, then the logical state of GND_DS 224 is changed from a de-asserted state to an asserted state. When signal generator 204 switches from VDD_DS 222 to GND_DS 224 to transmit as DS_OUT 210, it thereafter receives the same asserted logical state. As a result, DS_OUT 210 is continually in that same asserted state. Similarly, should the differential data strobe 122 be halted with DS_OUT 210 in the de-asserted state, then data strobe control logic 208 changes the logical state of VDD_DS 222 from its asserted state to a de-asserted state. When signal generator 204 switches from VDD_DS 222 to GND_DS 224, the same low logical level is thereafter received, resulting in DS_OUT signal 210 having a continuous de-asserted logical state as it toggles between VDD_DS 222 and GND_DS 224. This same approach is implemented to control the inverse data strobe signal DSN_OUT 212 by adjusting the logical states of VDD_DSN 228 and GND_DSN 226.

Figure 6:
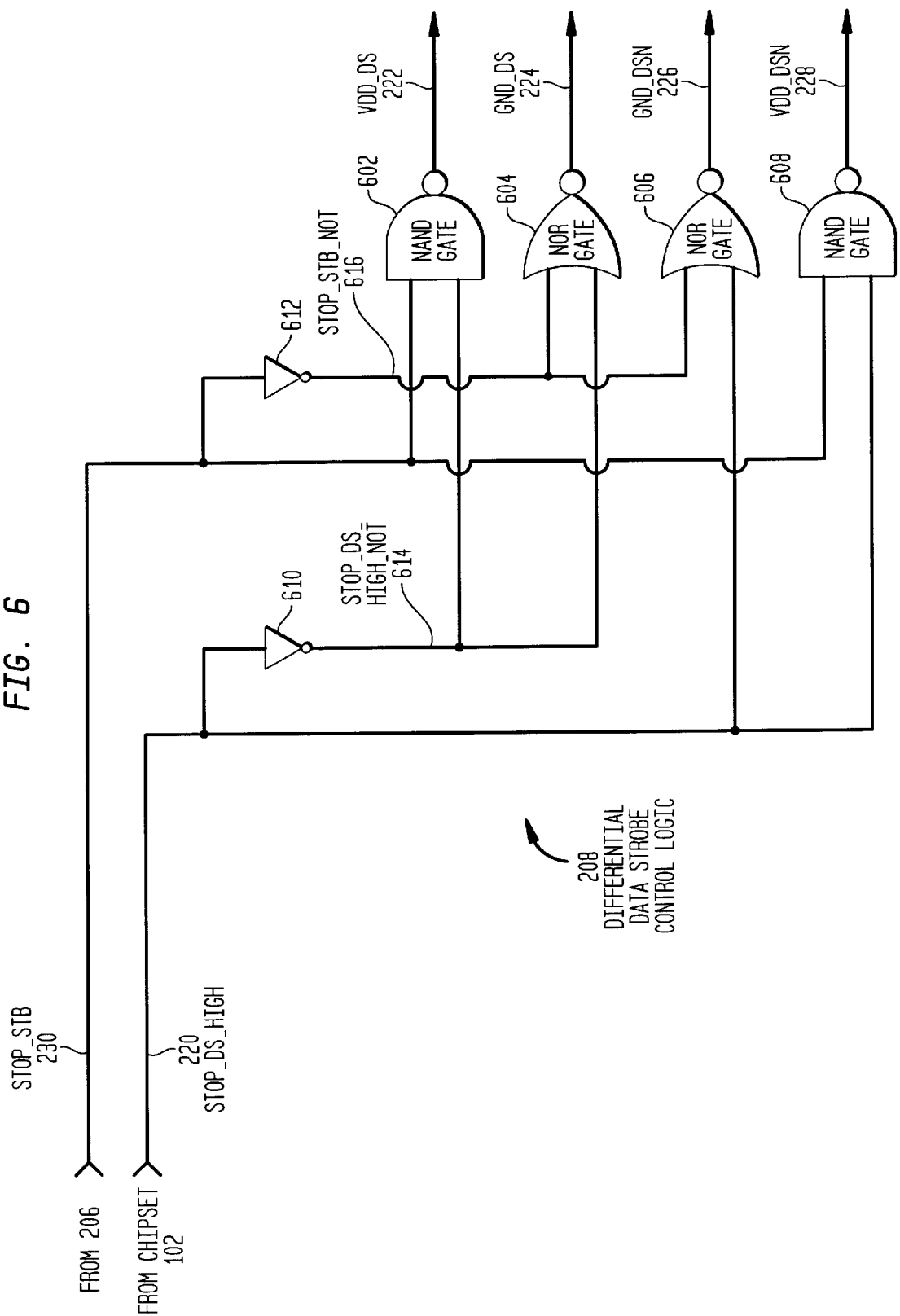
FIG. 6 is a schematic diagram of one embodiment of the differential data strobe control logic illustrated FIG. 2A.

Turning now to the logic elements illustrated in FIG. 6, control logic 208 includes four gates each generating one of the four logic level signals 222, 224, 226, 228 as its output. Specifically, VDD_DS 222 is the output of a NAND gate 602 having the strobe stop signal STOP_STB 230 and the inverse of the data strobe halt high signal STOP_DS_HIGH_NOT 614 provided as its inputs. GND_DS 224 is the output of a NOR gate 604 having the inverse of the stop strobe signal, STOP_STB_NOT 616, and STOP_DS_HIGH_NOT 614 provided as its inputs. GND_DSN 226 is the output of a NOR gate 606 having STOP_STB_NOT 616 and STOP_DS_HIGH 220 provided as its inputs. VDD_DSN 228 is the output of a NAND gate 608 having STOP_STB 230 and STOP_DS_HIGH 220 as provided at its input ports.

With regard to NAND gate 602, when the differential data strobe 122 is to be halted, as indicated by the assertion of STOP_STB 230, the output of NAND gate 602, VDD_DS 222, will then be the inverse of STOP_DS_HIGH_NOT 614, or the same state as STOP_DS_HIGH 220. Thus, when the data strobe signal DS_OUT 210 is to be in the asserted state when halted (STOP_DS_HIGH 220 is logical high), then VDD_DS 222 is set to its asserted state. When the data strobe 122 is to be in the de-asserted state when halted (STOP_DS_HIGH 220 is logical low), then VDD_DS 222 is set to its de-asserted state.

With regard to NOR gate 604, when the differential data strobe is to be halted, as indicated by the asserted state of STOP_STB 230, the inverse signal, STOP_STB_NOT 616 is applied to one input of NOR gate 604. The output of NOR gate 604, GND_DS 224, is then the inverse of the other input, STOP_DS_HIGH_NOT 614 and, therefore, has the same state as STOP_DS_HIGH 220. Thus, if the data strobe signal DS_OUT 210 is to be in the asserted state when halted, then GND_DS 224 is set to its asserted state. When the data strobe DS_OUT 210 is to be halted in the de-asserted state, then GND_DS 224 is set to its de-asserted state. Thus, when the differential data strobe 122 is to be halted, both, VDD_DS 222 and GND_DS 224 are set to the desired state in which the data strobe signal DS_OUT 210 is to be halted.

With regard to NOR gate 606, when the differential data strobe is to be halted as indicated by the asserted state of STOP_STB 230, the inverse signal, STOP_STB_NOT 616 is applied to one input of NOR gate 606. The output of NOR gate 606, GND_DSN 226, will then have a logical state that is the inverse of STOP_DS_HIGH 220. Thus, if the inverse data strobe signal DSN_OUT 212 is to be in the de-asserted state when halted (STOP DS_HIGH 220 is de-asserted), then GND_DSN 226 is set to its de-asserted state. Conversely, when the differential data strobe 122 is to be halted with DSN_OUT 212 asserted, then NOR gate 606 asserts GND_DSN 226.

Finally, with regard to NAND gate 608, when the differential data strobe 122 is to be halted with DS_OUT 210 asserted, as indicated by STOP_STB 230 being asserted, then the output of NAND gate 602. VDD_DSN 228, will be the inverse of STOP_DS_HIGH 220. Thus, when DSN_OUT 212 is to be in the de-asserted state when halted, VDD_DSN 228 is set to its de-asserted state. Conversely, when DSN_OUT 212 is to be in the asserted state when halted, VDD_DSN 228 is set to its asserted state. Thus, when the differential data strobe 122 is to be halted both, VDD_DSN 228 and GND_DSN 226 are set to the inverse of the state of STOP_DS_HIGH 220; that is, the opposite of the specified state of the data strobe signal DS_OUT 210.

Figure 7:
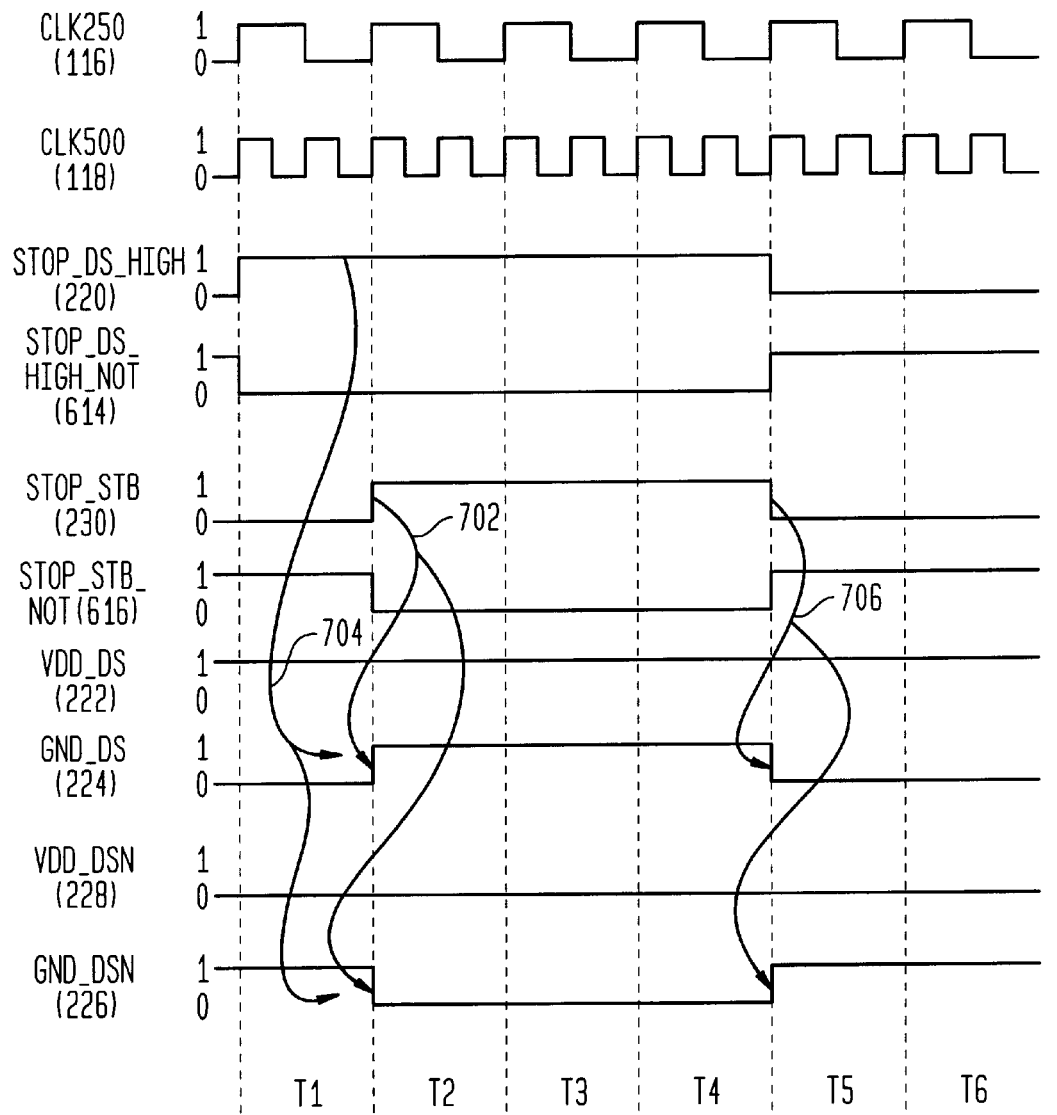
FIG. 7 is a timing diagram illustrating the relationship between the signals related to differential data strobe control logic.

FIG. 7 is a timing diagram illustrating the relationship between the signals related to differential data strobe control logic 208 when the strobe stopping logic 202 receives instructions to enter the halt data strobe mode of operation. In FIG. 7 the reference numerals for the signals/signal lines are provided in a parenthetical after the signal name to facilitate correlation with differential data strobe control logic 208 illustrated in FIG. 6. Also, the time periods illustrated in FIG. 7 have no relationship with other timing diagrams illustrated herein unless expressly stated.

In the example sequence illustrated in FIG. 7, STOP_DS_HIGH signal 220 is asserted at time period T1. This indicates that when the differential data strobe is halted, that the data strobe signal DS_OUT 210 should be halted in the high logical state while the data strobe not signal DSN_OUT 212 should be halted in the low logical state. During time period T1, VDD_DS 222 is asserted, GND_DS 224 is de-asserted, VDD_DSN 228 is de-asserted and GND_DSN 226 is asserted (that is, in normal mode).

Upon receipt of the stop strobe signal STOP_STB 230, certain of the level signals 222–228 are altered to accommodate the specified logic level for DS_OUT 210 and DSN_OUT 212. Since STOP_STB_HIGH 220 is asserted in this example, GND_DS 224 transitions from a de-asserted to an asserted state in time period T2. This is illustrated by arrows 702 and 704 in FIG. 7. GND_DS 224 remains in this state until STOP_STB 230 is de-asserted. Thus, for time periods T2–T4, VDD_DS 222 and GNT_DS 224 have the same asserted state. Thus, as level select logic 208 alternates between VDD_DS 222 and GND_DS 224 to drive DS_OUT 210, the same logic level is provided to control logic 208 during time periods T2–T4. When the differential data strobe is to no longer be halted, STOP_STB 230 is de-asserted, causing GND_DS 224 to return to its normal de-asserted state. This is illustrated by arrow 706 in FIG. 7.

Similarly, GND_DSN 226 transitions from a high state to a low state in time period T2 and remains in the de-asserted state until time period T4. See arrows 702–706 in FIG. 7. VDD_DSN 228 is not altered and remains in a de-asserted state. Thus, for time periods T2–T4 VDD_DSN 228 and GND_DSN 226 have the same de-asserted state. Thus, as level select logic 208 alternates between VDD_DSN 228 and GND_DSN 226 to drive DSN_OUT 212, the same logic level is provided to control logic 208 during time periods T2–T4.

e. Differential Data Strobe Signal Generator Logic

Figure 8:
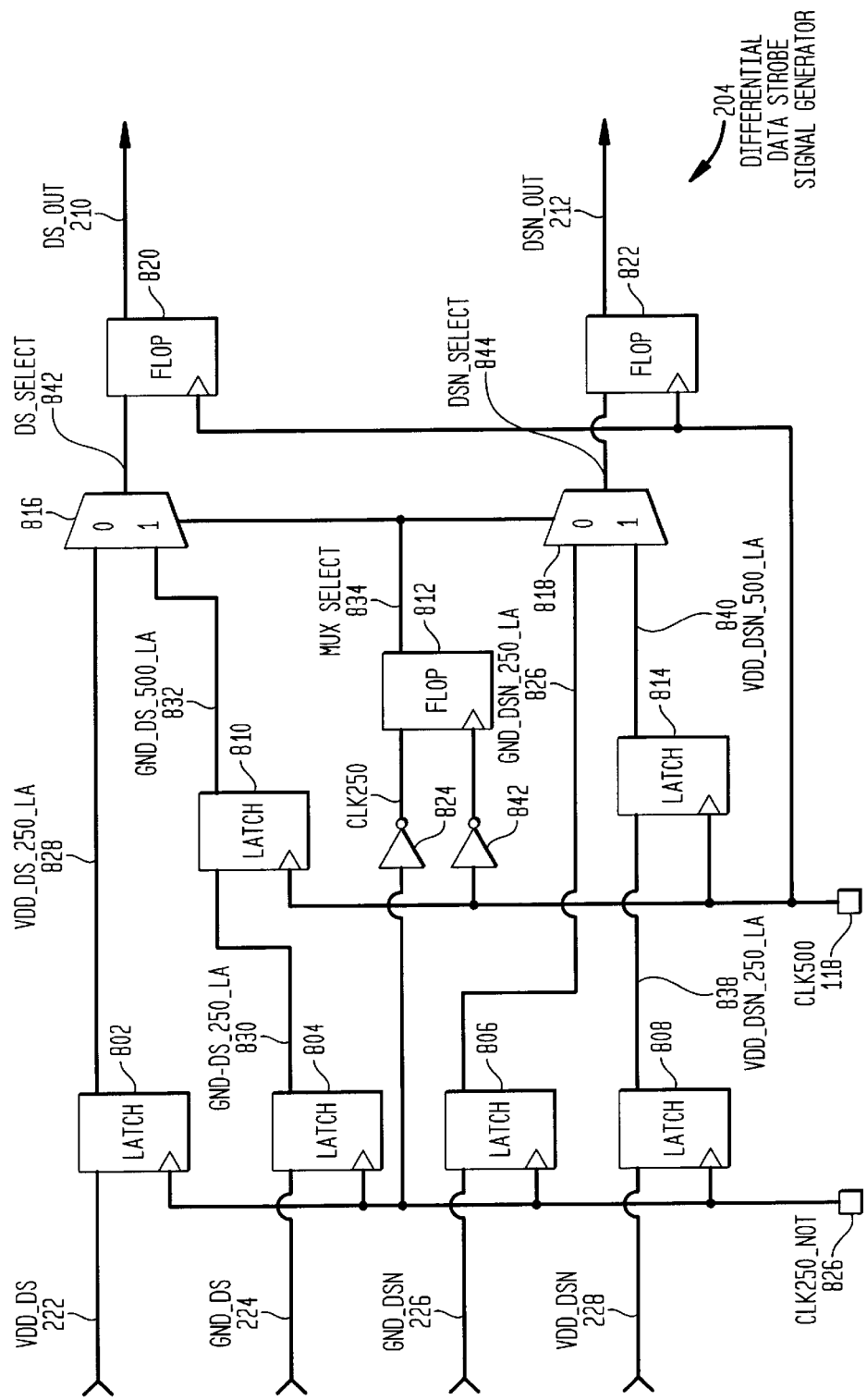
FIG. 8 is an architectural block diagram of one embodiment of differential data strobe signal generator illustrated in FIG. 2A.

FIG. 8 is an architectural block diagram of differential data strobe signal generator 204. Signal generator 204 selects alternately between two applied signal levels to generate DS_OUT 210 and DSN_OUT 212. As noted, differential data strobe level select logic 204 receives as inputs the four logic level signals VDD_DS 222, GND_DS 224, GND_DSN 226 and VDD_DSN 228. Either VDD_DS 222 or GND_DS 224 is selected as DS_OUT 210. Similarly, either GND_DSN 226 or VDD_DSN 228 is selected as DSN_OUT 212.

During normal operations, these input signals are consistently held in the asserted (VDD_DS 222 and VDD_DSN 228) and de-asserted (GND_DS 224 and GND_DSN 226) states. During normal operations the data strobes are 250 MHz pulses with DS_OUT being the inverse of DSN_OUT. These pulses are generated by selecting VDD_DS 222 for the first half of a 250 MHz cycle and GND_DS 224 for the second half. Similarly, DSN_OUT 212 selects GND_DSN 226 for half of a 250 MHz cycle and VDD_DSN 228 for the other half cycle.

Upon receipt of the stop strobe signal STOP_STB 230, certain of the level signals 222, 224, 226, 288 are altered to accommodate the specified logic level for DS_OUT 210 and DSN_OUT 212. Since STOP_STB_HIGH 220 is asserted in this example, GND_DS 224 transitions from a de-asserted to an asserted state in time period T2. This is illustrated by arrows 702 and 704 in FIG. 7. GND_DS 224 remains in this state until STOP-STB 230 is de-asserted. Thus, for time periods T2–T4, VDD_DS 222 and GND_DS 224 have the same asserted state. Thus, as level select logic 208 alternates between VDD_DS 222 and GND_DS 224 to drive DS_OUT 210, the same logic level is provided to control logic 208 during time periods T2–T4. When the differential data strobe is to no longer be halted, STOP_STB 230 is de-asserted, causing GND_DS 224 to return to its normal de-asserted state. This is illustrated by arrow 706 in FIG. 7.

The input level signals VDD_DS 222 and GND_DS 224 are passed through transparent latches 802, 804, respectively when the inverse of the 250 MHz clock signal CLK250_NOT 826 is asserted. The nomenclature used for the latched signals refer to the latch rate and include an "LA" to indicate it is the latched signal. Thus, the signal output from latch 802 is referred to as VDD_DS_250_LA 828. GND_DS_250_LA 830 is then provided to transparent latch 810, which passes the signal through when the 500 MHz clock is asserted. The resulting signal, GND_DS_500_LA 832 is provided as one of two inputs to a multiplexer 816. The other input to multiplexer 816 is VDD_DS_250_828. MUX_SELECT signal 834 selects which of the two inputs, VDD_DS_250_LA 828 or GND_DS_500_LA 832 is to be presented as DS_SELECT 842 at any given time. Multiplexer 816 is controlled by MUX_SELECT signal 834.

MUX_SELECT 834 is a 250 MHz pulse synchronized with CLK500 116 due to the inverter 824 inverting CLK250_NOT 826. The 250 MHz clock is latched into flip-flop 812 using the falling edge of the 500 MHz clock to generate MUX_SELECT 834. MUX_SELECT 834 rises on the falling edge of CLK500 118, driving multiplexer 816 with a 250 MHz pulse that is shifted by half of a 500 MHz cycle.

The output of multiplexer 816, DS_SELECT 842, follows GND_DS_500_LA 832 when MUX_SELECT 834 is asserted and follows VDD_DS_250_LA 828 when MUX_SELECT 834 is de-asserted. The output of multiplexer 816, DS_SELECT 842, is latched into flip-flop 820 at 500 MHz to generate DS_OUT 210. Thus, a change in state of DS_SELECT 842 is detected at the next rising edge of the 500 MHz clock.

Similar logic is provided for selecting the level of DSN_OUT 212. Referring again to FIG. 8, the input level signals 226, 228 are received by signal generator 204 by transparent latches 806, 808, respectively. Latches 806, 808 are controlled by an inverse 250 MHz clock signal CLK250_NOT 826. GND_DSN 226 is passed through transparent latch 806 when CLK350_NOT is asserted, with the latched signal referred to as GND_DSN_250_LA 836. VDD_1_DSN_250_LA 838 is then provided to transparent latch 814 which operates at 500 MHz. The resulting signal VDD_DSN_500_LA 840 is provided as one of two inputs to a multiplexer 818. The other input is GND_DSN_250_LA 836.

MUX_SELECT signal 834 selects which of the two inputs, GND_DSN_250_LA 836 or VDD_DSN_500_LA 840 are to be presented as DSN_SELECT 844. As noted, MUX_SELECT 834 is a 250 MHz pulse that continually alternates between the two inputs, rising on the falling edge of CLK500 118. The output of multiplexer 818, DSN_SELECT 844, follows GND_DSN_250_LA 836 when MUX_SELECT 834 is de-asserted and follows VDD_DSN_500_LA 840 when MUX_SELECT 834 is asserted. MUX_SELECT 834 drives multiplexer 818 with a 250 MHz pulse that is shifted by half of a 500 MHz cycle. The output of multiplexer 818, DSN_SELECT 844 is latched at 500 MHz by flip-flop latch 822 to generate DSN_OUT 212. Thus, a change in state of DSN_SELECT 844 is detected at the next rising edge of the 500 MHz clock.

Thus, as shown in FIG. 8 and as described above, in certain aspects of the present invention, signal generator 204 includes redundant components to generate DS_OUT 210 and DSN_OUT 212. In addition to the same components in the same configuration, the components utilize the same system clocks. By providing the same physical and electrical configuration of components, these two signals experience injected link noise common-mode.

Figure 9:
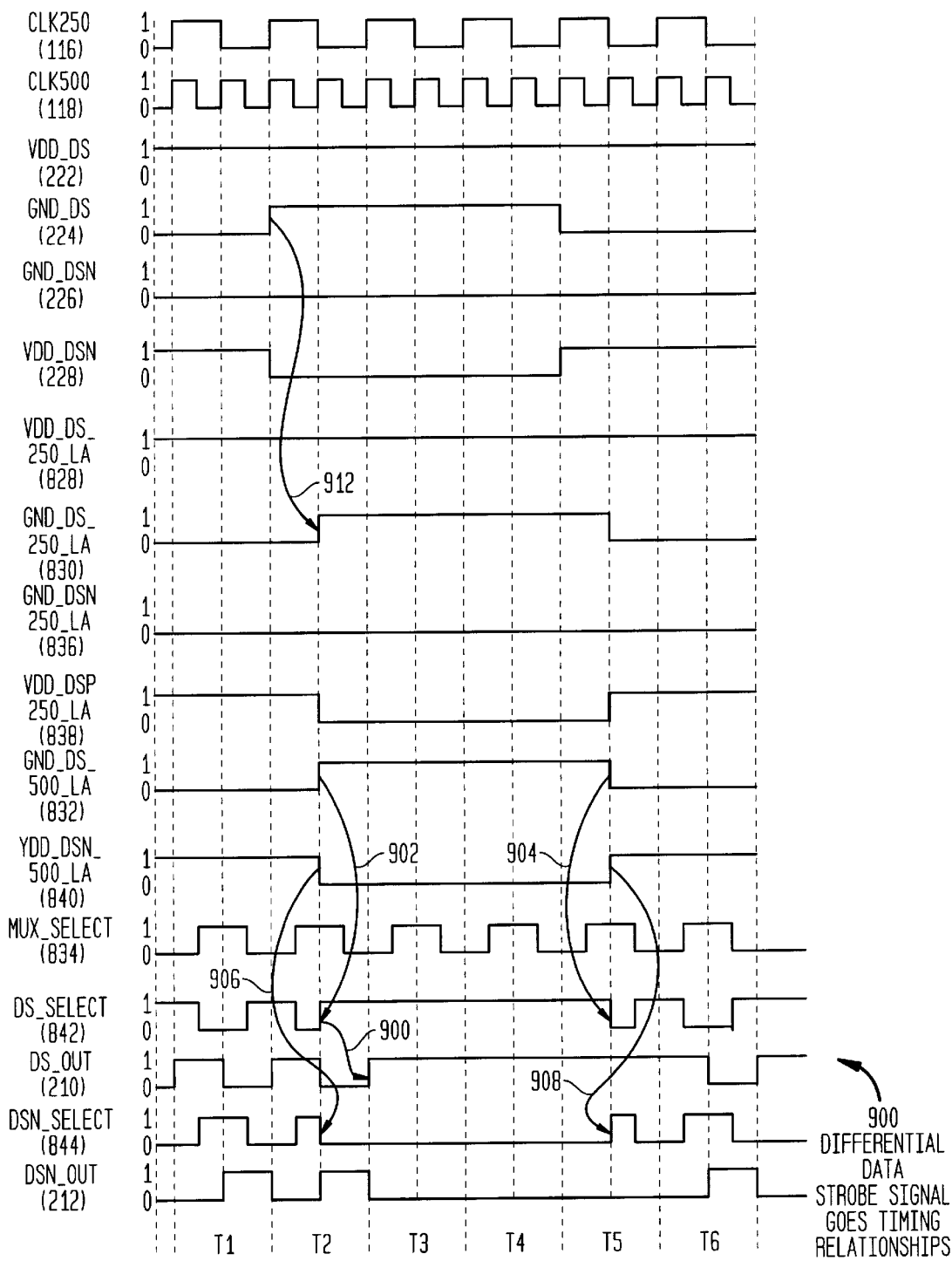
FIG. 9 is a diagram illustrating the timing relationships between the signals that appear in FIG. 8.

FIG. 9 is a diagram illustrating the timing relationships between the signals that appear in FIG. 8. In this timing diagram there are six time periods. The four input logic level signals are shown at the top of FIG. 9. During the first time period (and before) they were at levels associated with the normal mode of operation. That is, VDD_DS 222 and VDD_DSN 228 were in the asserted state and GND_DS 224 and GND_DSN 226 were in the de-asserted state.

In this exemplary sequence of waveforms, from time period T2 through time period T4 transmitter 108 is in the halt data strobe mode of operation. The specified logic levels of signals 222, 224, 226, 288 is such that DS_OUT 210 will be halted in the asserted state while DSN_OUT 212 will be halted in the de-asserted state. To achieve this, GND_DS 224 transitions from a de-asserted to an asserted state for these time periods as shown in FIG. 9. As a result, both VDD_DS 222 and GND_DS 224 to transmit as DS_SELECT 842. With both such signals in the asserted state the selection of either will cause DS_SELECT 832 to be continually in the asserted state; that is, halted in the asserted state.

Conversely, VDD_DSN 228 transitions from an asserted state to a de-asserted state for time periods T2–T4. Thus, during the relevant time period both GND_DSN 226 and VDD_DSN 228 are in the de-asserted state. As noted, level select logic 204 alternately selects GND_DSN 226 and VDD_DSN 228 to transmit as DSN_SELECT 844. With both such signals in the de-asserted state during time periods T2 through T4, the selection of either will cause DSN_SELECT 844 to be continually in the de-asserted state; that is, halted in the de-asserted state.

The corresponding latched signals 828, 830, 836, 838 and 840 are also illustrated in FIG. 900. As shown, the signal level signals 222, 224, 226, 228 are passed through their respective transparent latch when CLK250 116 is de-asserted due to the use of the inverse clock signal CLK250_NOT 826 to provide the clock input to latches 802–808. Since GND-DS 224 and VDD_DSN 228 transition at a rising edge of CLK250 116, there is a half cycle delay between the latched signals 828, 830, 836 and 838 and the signals 222, 224, 226, 228. One example of this is illustrated by arrow 912 sho3ing the relationship between the rising edge of GND_DS 224 and the subsequent rising edge of GND_DS_250_LA 830.

Below the latch signals in FIG. 9 is MUX_SELECT signal 834. As noted, MUX_SELECT is a 250 MHz pulse that alternately selects continuously between the two inputs of the multiplexers 816 and 818. MUX_SELECT 834 rises on the falling edge of CLK500 118 and drives multiplexer 816 with a 250 MHz pulse that is shifted by half of a 500 MHz cycle.

Turning now to DS_SELECT 842, when MUX_SELECT 834 is asserted, DS_SELECT 842 is set equal to GND_DS_500_LA 832 and when MUX_SELECT 834 is de-asserted, DS_SELECT 842 is set equal to VDD_DS_250_LA 828. Thus, DS_SELECT 842 transitions to and maintains an asserted state in response to GND_DS_500_LA 832 transitioning at the rising edge of CLK500 118 during time period T2. This is illustrated by arrow 902 in FIG. 9. DS_SELECT 842 remains in the asserted state until GND_DS_500_LA 832 is de-asserted, as shown by arrow 904 in FIG. 9. A similar relationship exits between DSN_SELECT 844 and GND_DSN_250_LA 836 and VDD_DSN_500_LA 840. This is illustrated by arrows 906 and 908 in FIG. 9.

As noted, DS_SELECT 842 is latched by flip-flop 820 using the rising edge of CLK500 118. Thus, DS_OUT 210 transitions to the state of DS_SELECT 842 at the next rising edge of CLK500 118. As a result, in this example, DS_OUT 210 is shifted from DS_SELECT 842 by a 500 MHz cycle. This is illustrated by arrow 910 in FIG. 9.

2. Data Transmit Logic 112

Figure 11:
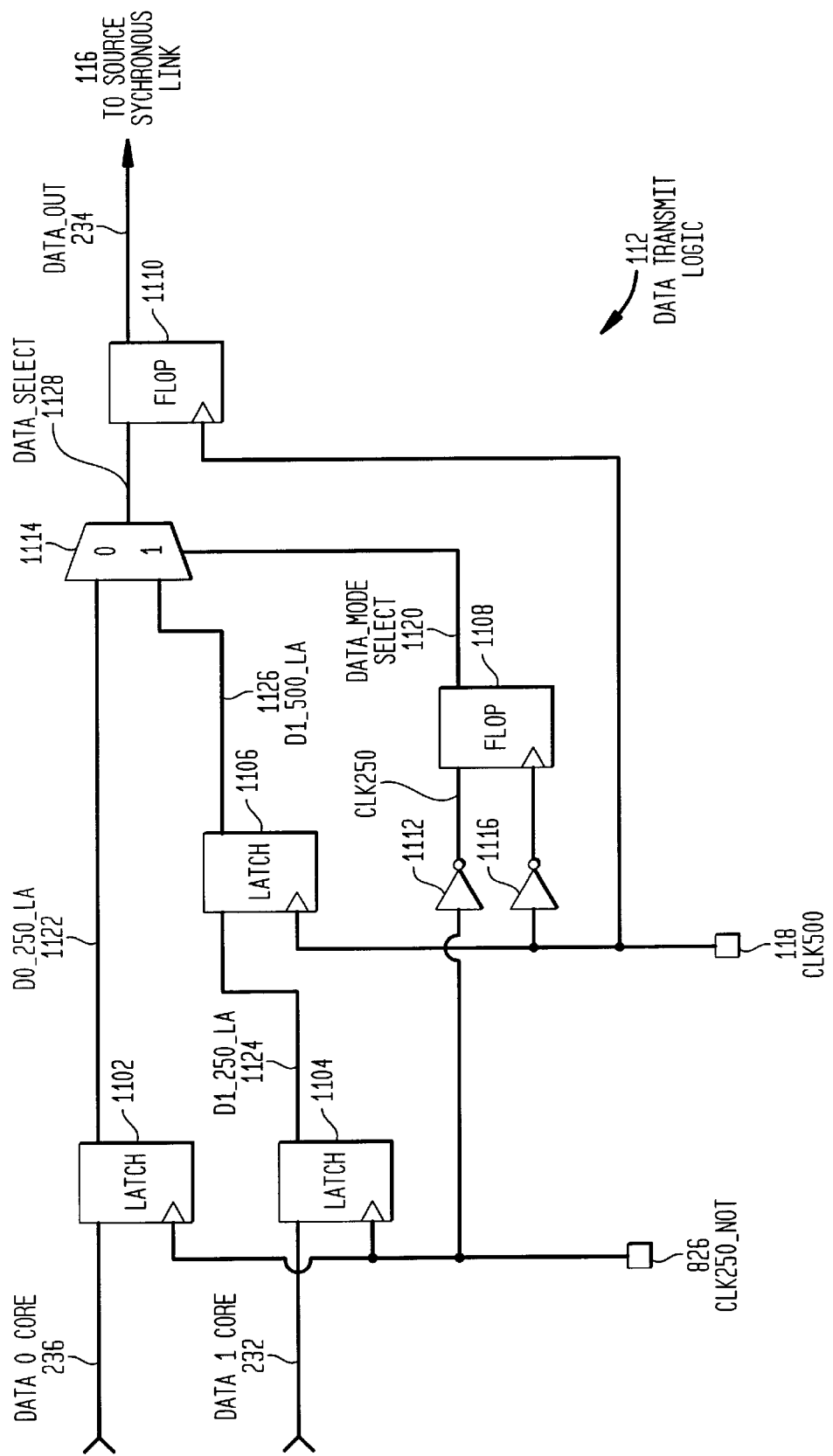
FIG. 11 is an architectural circuit diagram of one embodiment of the data transmit logic illustrated in FIG. 1.

FIG. 11 is an architectural circuit diagram of one embodiment of data transmit logic 112. As noted, data transmit logic 112 receives data from processing core 102 at 250 MHz and transmits that data onto communication link 106 at a clock rate of 500 MHz. As will be described in detail below, the data signal 120 is preferably driven at twice the period of the data strobe signals. This causes the data strobe signal 122 and data signal 120 to transition logical states at the same time and at the same frequency, insuring maximally similar electrical modes on the communication link, further maximizing link margin.

In accordance with another aspect of the invention, DATA_OUT 234 and differential data strobe signals DS_OUT 210 and DSN_OUT 212 are processed through the same logical and physical components in source synchronous transmitter 108. Thus, the configuration of data transmit logic 112 illustrated in FIG. 11 is the same as one half of the circuit configuration of data strobe signal generator 204 illustrated in FIG. 8. As noted, this insures injected link noise is experienced by both, DATA_OUT 234 and DS_OUT 210 and DSN_OUT 212.

Referring to FIG. 8, recall that differential data strobe signal generator 204 generates both differential data strobe signals, DS_OUT 210 and DSN_OUT 212. The top portion of FIG. 8 is directed to generating DS_OUT 210 while the bottom half is directed towards generating DSN_OUT 212. Flip-flop 812 is shared by both portions of circuit 204.

Referring now to FIG. 11, data transmit logic 112 will now be described. A series of transparent latches and D flip-flops are provided to latch the two data signals DATA0_CORE 236 and DATA1_CORE 232 for data signal DATA_OUT 234. Each such latch imposes an additional delay to the signal depending on whether the latches and flip-flops are responsive to the rising(or falling edges of the 250 MHz clock CLK250 116 or 500 MHz clock CLK500 118.

The data signals DATA0_CORE 236 and DATA1_CORE 232 are latched into transparent latches 1102, 1104, respectively, using the inverse of the 250 MHz clock signal CLK250_NOT 826. The signal output from transparent latch 1102 is D0_250_LA 1122. Similarly, the signal output from transparent latch 1104 is D1_250_LA 1124.

D1_250_LA 1124 is input to transparent latch 1106 which latches the signal using the rising edge of the 500 MHz clock CLK500 118. The resulting signal, D1_500_LA 1126 is provided as one of two inputs of a multiplexer 1114. The other input to multiplexer 1114 is D0_250_LA 1122. DATA_MUX_SELECT signal 1120 selects which of the two inputs is to be presented as DATA_SELECT 1128 at any given time. Multiplexer 1114 is controlled by DATA_MUX_SELECT signal 1120.

DATA_MUX_SELECT signal 1120 is a 250 MHz pulse synchronized with CLK250 116 due to the inverter 1112 inverting CLK250_NOT 826. The 250 MHz clock is latched into flip-flop 1108 using the falling edge of the 500 MHz clock CLK500 118 due to inverter 1116. DATA_MUX_SELECT 1120 rises on the falling edge of CLK500 118, driving multiplexer 1114 with a 250 MHz pulse that is shifted by half of a 500 MHz cycle from CLK250 116.

The output of multiplexer 1128, DATA_SELECT 1128, outputs D1_500_LA 1126 when DATA_MUX_SELECT 1120 is asserted, outputs D0_250_LA 1122 when DATA_MUX_SELECT 1120 is de-asserted. The output of multiplexer 1114, DATA_SELECT 1128, is latched into flip-flop 1110 at 500 MHz to generate DATA_OUT 234. Thus, a change in state of DATA_SELECT 1128 is detected at the next rising edge of the 500 MHz clock CLK500 118.

As noted, data transmit logic 112 is identical to each of the two portions of differential data strobe signal generator 204 that transmit DS_OUT 210 and DSN_OUT 212. For example, in one embodiment, latches 802, 804 and 810 are identical to latches 1102, 1104 and 1106, flip-flops 812 and 820 are identical to 1108 and 1110, and multiplexer 816 is identical to multiplexer 1114. In addition the components are arranged in the same configuration and utilize the same system clocks 116 and 118.

Figure 12:
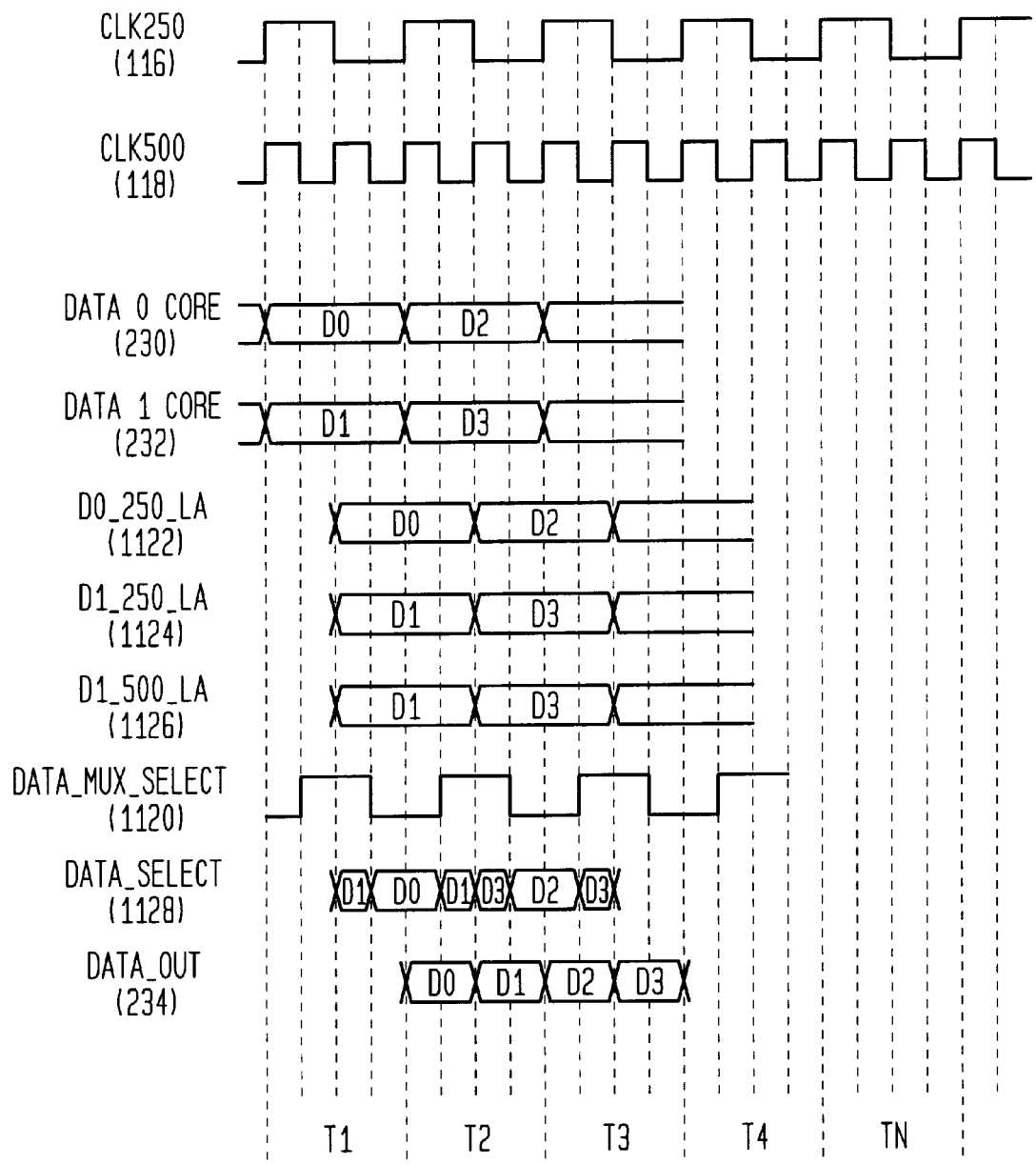
FIG. 12 is a timing diagram illustrating the relationship between the signals illustrated in FIG. 11.

The relationship between the signals illustrated in FIG. 11 is provided in FIG. 12 in connection with an exemplary data transfer. As noted with the other timing diagrams, there is no implied relationship between the time periods T1–Tn illustrated in FIG. 12 and the same or similar time periods appearing in other timing diagrams of this disclosure. The 250 MHz clock CLK250 116 and the 500 MHz clock CLK500 118 are depicted at the top of FIG. 12. Below these two waveforms are the two data core signals received by data transmit logic 112 from processing core 102, DATA0_CORE 236 and DATA1_CORE 232. Two bits of data are illustrated, bits D0 and D2 at time periods T1 and T2 on DAT0_CORE 236 and bits D1 and D3 at time periods T1 and T2 on DATA1_CORE 232.

D0 and D2 are latched on the next falling edge of CLK250, as shown by D0_250_LA 1122. Similarly, D1 and D3 are latched on the next falling edge of CLK250, as shown by D1_250_LA 1124. D1_250_LA 1124 is latched at the next rising edge of CLK500 118 to output D1_5000_LA 1126.

DATA_MUX_SELECT 1120 is a 250 MHz pulse synchronized with CLK500 116 and is generated by latching the 250 MHz clock using the falling edge of the 500 MHz clock. Thus, DATA_MUX_SELECT 1120 rises on the falling edge of CLK500 118. DATA_SELECT 1128 illustrates the selection of either signal 1122 or 1126 as DATA_MUX_SELECT 1120 toggles. DATA_SELECT 1128 is latched into a flip-flop 1110 on the falling edge of CLK500 118 due to the inverter 118 inverting CLK500 118. This results in the DATA_OUT signal 234 illustrated in FIG. 12, which is the same as that depicted in FIG. 2B. Thus, data transmit logic 112 transmits the received data over a DATA_OUT signal 234 at 500 MHz. By transmitting the data signal at twice the frequency as the differential data strobe signals, this aspect of the present invention cause the data and data strobe signals to experience a logic state transmission at the same time and at the same frequency, here, each rising edge of the higher frequency, or every 500 MHz.

E. Source Synchronous Link Receiver 110

Figure 10:
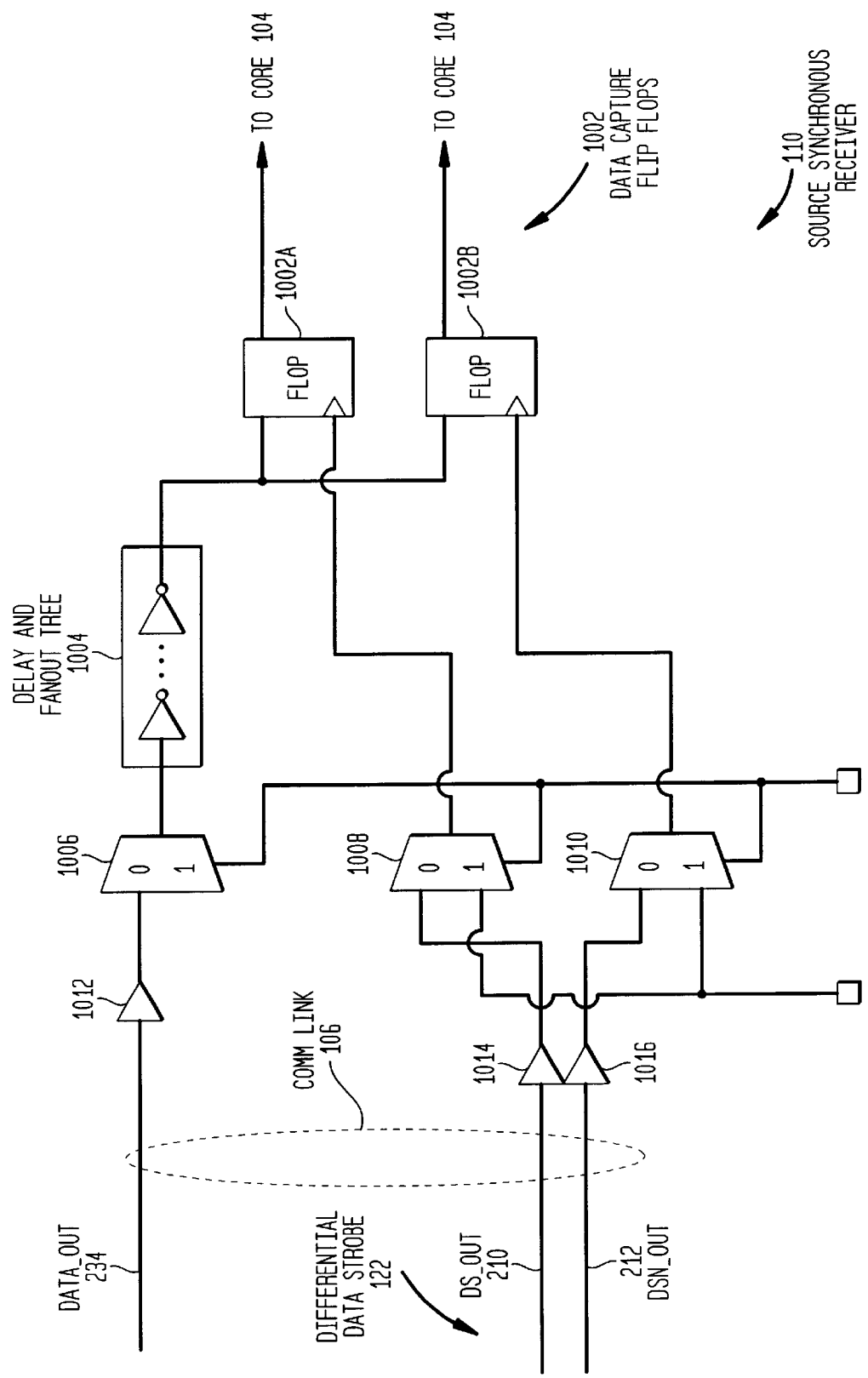
FIG. 10 is a schematic block diagram of one embodiment of the source synchronous receiver illustrated in FIG. 1.

FIG. 10 is a schematic block diagram of one embodiment of source synchronous receiver 110. Source synchronous receiver 110 receives DATA_OUT 234 and differential data strobe signals DS_OUT 210 and DSN_OUT 212. Differential data strobe DS_OUT 210 and DSN_OUT 212 are 250 MHz clock signals while DATA_OUT 234 transmits data at 500 MHz. That is, during each period of the differential data strobe 122, 2 bits of data are received by source synchronous receiver 110. This is referred to as being "double pumped" in that two bits of data rather than one are transmitted during each clock cycle. As noted, this provides the advantage of providing a data signal that transitions with each transition of the differential data strobe 122.

DATA_OUT 234 is received by a receiver 1012 and passed through a multiplexer 1006. Multiplexer 1006 selects either DATA_OUT 234 or an unrelated signal based on criteria not-relevant to the present invention. Similarly, DS_OUT 210 and DSN_OUT 212 are received by receivers 1014 and 1016 and passed through multiplexers 1008 and 1010. Multiplexers 1008 ad 1010 are controlled similarly.

DS_OUT 210 is used to latch data capture flip-flop 1002A while DSN_OUT 212 is used to latch data capture flip-flop 212. Thus 2 bits of data are latched with each data strobe clock cycle. The rising edge of the differential data are latched with each data strobe clock cycle. The rising edge of the differential data strobe DS_OUT 210 clocks flip-flop 1002A while the rising edge of DSN_OUT 212 clocks flip-flop 1002B. With this approach, the data capture flip-flops latch in 2 bits of data in a single data strobe cycle; that is 2 bits per 250 MHz, or 500 MHz.

The received data signal is passed through a delay and fan-out tree 1004 that induces delay in the data signal. As noted, in one embodiment, the differential data strobe is used to clock 18 pairs of data capture flip-flops 1002 since there are 18 data lines similar to that which carries DATA_OUT 234. This distribution of the differential data strobe 122 imparts delay in DS_OUT 210 and DSN_OUT 212 that is not experienced by DATA_OUT 234. Delay and fanout tree 1004 increases the delay experienced by the data signal 234 so that the buffering of the data signal and differential data 122 strobe are matched; that is, the differential data strobe is out of phase with the data strobe; that is, the edge of the differential data strobe occurs in the middle of the data eye. This insures the DATA_OUT signal 234 is stable before latched into data capture flip-flops 1002.

In accordance with one aspect of the invention, DATA-OUT 234 and differential data strobe signals DS_OUT 210 and DSN_OUT 212 are processed through the same logical and physical components in source synchronous receiver 110. Thus, driver 1012 is identical to driver 1014 and 1016. Similarly, multiplexer 1006 is identical to multiplexer 1008 and 1010, and the select line is driven by the same local clock. For the reason set forth above, in certain implementations of source synchronous receiver 110, a delay and fanout tree 1004 is implemented to compensate for delays across such receivers. As noted, this insures injected link noise is experienced by both, DATA_OUT signal 234 and the differential data strobe signals 122.

Figure 13:
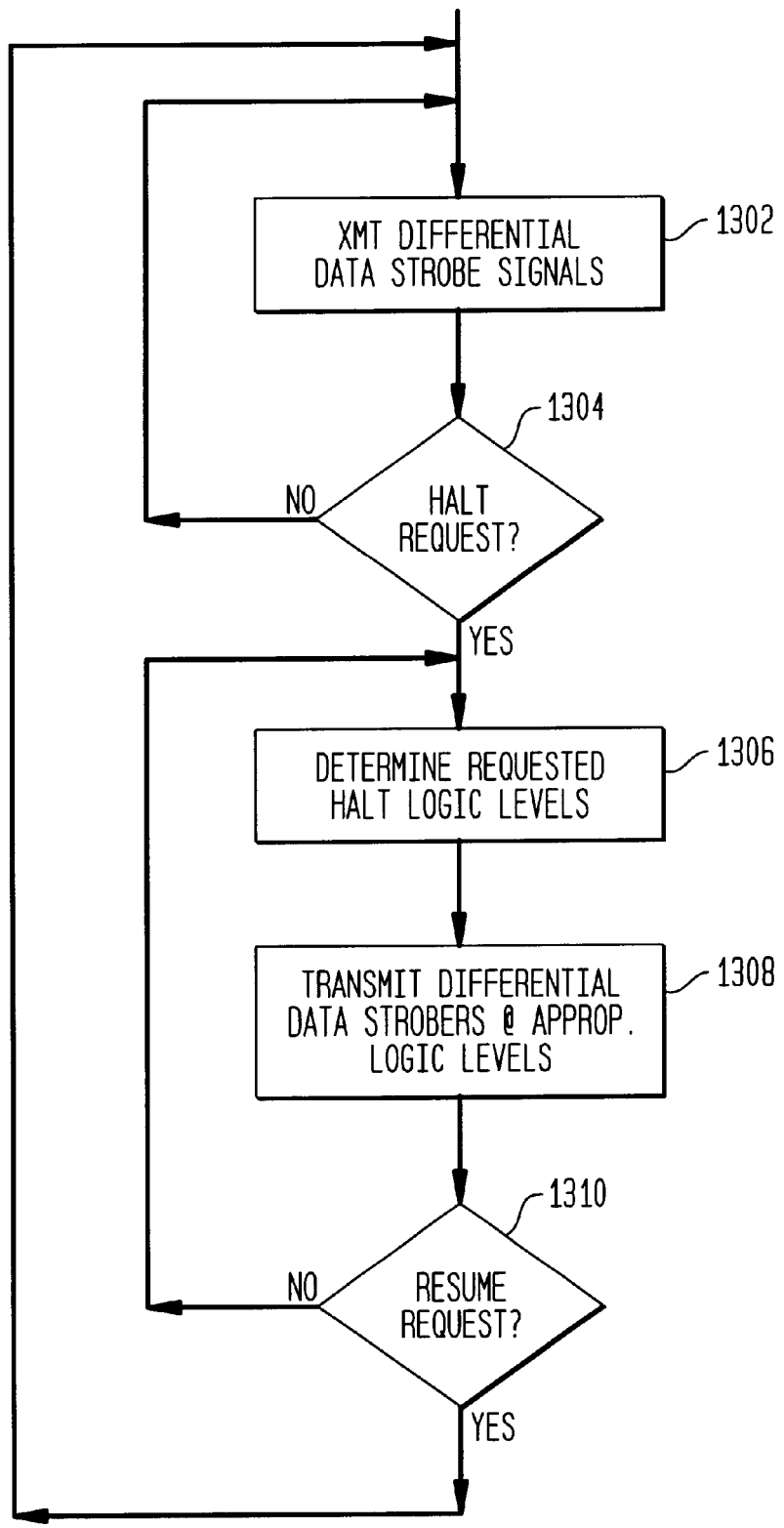
FIG. 13 is a flow chair of one embodiment of the processes performed to halt a differential data strobe in a source synchronous link.

FIG. 13 is a flow chart of the processes performed in accordance with one embodiment of the present invention to halt a differential data strobe transmitted on a source synchronous link 100.

At block 1302 the transmitter is transmitting a differential data strobe signal in normal operating mode. That is, the differential data strobe is two opposing phase clock signals transmitted at a first clock frequency over two clock lines of a communication link 106. The data strobe signals alternate between a high logical state and a low logical state during each cycle of the data strobe signal.

At block 1304 the source synchronous transmitter receives a command from a host processing core to halt the differential data strobe signal 122. Preferably, the logical state in which the data strobe will be halted can be specified, in which case the transmitter determine what that logical state is at block 1306.

In response to the halt request and, perhaps, the logic level specification, at block 1306 the source synchronous transmitter maintains the differential data strobe signals transmitted by the transmitter at one of either the high logical state or the low logical state.

This continues indefinitely until the transmitter receives a request to resume normal data strobe transmissions, in which case processing continues at block 1302.

Further features of the present invention are described in commonly-owed U.S. Utility patent application Ser. No. 09/560,364 entitled "HALTING DATA STROBES ON A SOURCE SYNCHRONOUS LINK AND UTILIZATION OF SAME TO DEBUG DATA CAPTURE PROBLEMS" naming as inventors Karen Lo and Robert D. Snyder, filed concurrently herewith the specification of which is herein incorporated by reference in its entirety.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A source synchronous link comprising:
   a source synchronous receiver;
   a communication link; and
   a source synchronous transmitter, communicably coupled to said receiver through said communication link, comprising,
   a first logic structure configured to generate a data signal over a data line of said communication link, and
   a second logic structure configured to generate one or more data strobe signals over a corresponding one or more clock lines of said communication link,
   wherein said first logic structure and said second logic structure have a substantially identical configuration and operate in response to a same local clock,
   wherein said data signal and data strobe signals experience logical state transitions simultaneously, and wherein said one or more data strobe signals are transmitted at a first frequency and said data signal transmits data at a second frequency that is twice said first frequency.

2. The source synchronous link of claim 1,
   wherein said communication link routes said data line and said one or more clock lines in close proximity to each other between said transmitter and receiver.

3. The source synchronous link of claim 1, wherein said data signal and said data strobe signals arc routed through identical logical and physical elements in said source synchronous receiver.

4. The source synchronous link of claim 1, wherein said data strobe signals are generated as single ended bits with opposing phases.

5. The source synchronous link of claim 1, wherein at said receiver said data signal and said one or more data strobe signals have a relative phase such that said one or more data strobe signals have a rising or falling edge that is centered in the data eye of said data signal.

6. The source synchronous link of claim 5, wherein said communication link comprises printed circuit board traces and wherein said clock lines are longer than said data line sufficient to cause said relative phase shift.

7. The source synchronous link of claim 2, wherein a relative frequency of said data signal and said one or more data strobe signals are such that said data signal and data strobe signals experience logical state transitions simultaneously.

8. A source synchronous link comprising:
   a communication link;
   a source synchronous transmitter, including a first logic structure configured to generate a data signal over a data line of the communication link, and a second logic structure configured to generate one or more data strobe signals over a corresponding one or more clock lines of the communication link,
   wherein said first logic structure and said second logic structure are of substantially identical configuration and operate in response to a same local clock,
   wherein said communication link routes said data line and said corresponding one or more clock lines in close proximity to each other between said transmitter and a receiver, and
   wherein said data signal and said data strobe signals are routed in through identical logical and physical elements in said receiver,
   wherein at said receiver said data signal and said one or more data strobe signals have a relative phase such that said one or more data strobe signals have a rising or falling edge that occurs during the data eye of said data signal, and wherein said clock lines and said data line have a relative length that causes a relative phase shift.

9. The source synchronous link of claim 8, wherein a relative frequency of said data signal and a relative frequency of said one or more data strobe signals are such that said data signal and data strobe signals experience logical state transitions simultaneously and at a same frequency.

10. The source synchronous link of claim 9, wherein said one or more data strobe signals are transmitted at a first frequency and said data signal transmits data at a second frequency that is twice said first frequency.

11. The source synchronous link of claim 8, wherein said data signal is double pumped, and wherein a relative frequency of said data signal and a relative frequency of said data strobe signals are such that said data signal and said data strobe signals transition logical states simultaneously.

12. The source synchronous link of claim 8, wherein said data strobe signals are generated as single ended bits with opposing phases.

* * * * *